United States Patent
Liu et al.

(10) Patent No.: US 12,267,846 B2
(45) Date of Patent: Apr. 1, 2025

(54) COMMUNICATION METHOD AND APPARATUS FOR PROVIDING HARQ INFORMATION VIA SIDELINK

(71) Applicant: Huawei Technologies Co., Ltd., Shenzhen (CN)

(72) Inventors: Nannan Liu, Beijing (CN); Xiangdong Zhang, Shenzhen (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 510 days.

(21) Appl. No.: 17/706,961

(22) Filed: Mar. 29, 2022

(65) Prior Publication Data

US 2022/0217768 A1 Jul. 7, 2022

Related U.S. Application Data

(63) Continuation of application No. PCT/CN2019/109769, filed on Sep. 30, 2019.

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1812* (2013.01); *H04L 5/0053* (2013.01); *H04W 72/20* (2023.01); *H04W 92/18* (2013.01)

(58) Field of Classification Search
CPC ....... H04W 92/18; H04W 4/40; H04W 72/23; H04W 76/14; H04W 72/20; H04W 72/04; H04W 4/46; H04L 1/1812; H04L 5/0053
See application file for complete search history.

(56) References Cited

U.S. PATENT DOCUMENTS 10,225,847 B2  3/2019  Chae et al.
10,869,296 B2  12/2020  Loehr et al.
(Continued)

FOREIGN PATENT DOCUMENTS

| CN | 107534982 A | 1/2018 |
|----|-------------|--------|
| CN | 107615844 A | 1/2018 |
| EP | 3051736 A1  | 8/2016 |

OTHER PUBLICATIONS

"Design and Contents of PSCCH and PSFCH," Agenda Item: 7.2.4.1.5, Source: Huawei, HiSilicon, Document for: Discussion and Decision, 3GPP TSG RAN WG1 Ad-Hoc Meeting 1901, XP051593704, R1-1900858, Jan. 21-25, 2019, 9 pages.
(Continued)

*Primary Examiner* — Allahyar Kasraian
(74) *Attorney, Agent, or Firm* — SLATER MATSIL, LLP

(57) ABSTRACT

A communication method and an apparatus, the method including determining, by a first terminal, first hybrid automatic repeat request (HARQ) information associated with a first sidelink grant, where the first sidelink grant is associated with carrying data between the first terminal and a second terminal, and where the first HARQ information comprises a first HARQ process identifier associated with the first sidelink grant, and sending, by the first terminal, the first HARQ information to the second terminal through a sidelink, where the sidelink is a direct wireless communication link between the first terminal and the second terminal.

17 Claims, 18 Drawing Sheets

(51) Int. Cl.
*H04L 5/00* (2006.01)
*H04W 72/20* (2023.01)
*H04W 92/18* (2009.01)

(56) References Cited

U.S. PATENT DOCUMENTS

| | | | |
|---|---|---|---|
| 2019/0044667 A1 | 2/2019 | Guo et al. | |
| 2020/0267729 A1* | 8/2020 | Kim | H04W 72/20 |
| 2020/0275474 A1* | 8/2020 | Chen | H04L 1/1848 |
| 2020/0304247 A1* | 9/2020 | Loehr | H04L 1/1822 |
| 2021/0045178 A1* | 2/2021 | Kung | H04W 76/18 |
| 2021/0212104 A1* | 7/2021 | Li | H04W 72/23 |
| 2021/0314991 A1* | 10/2021 | Tenny | H04W 4/40 |

OTHER PUBLICATIONS

"Other Aspects on Physical Layer Structure for NR Sidelink," Agenda Item: 7.2.4.8, Source: Fujitsu, Document for: Discussion/Decision, 3GPP TSG RAN WG1 #98, XP051764843, R2-1908224, Aug. 26-30, 2019, 19 pages.

"SL HARQ Operation," Agenda Item: 4.2, Source: Lenovo, Motorola Mobility, Document for: Discussion, Decision, 3GPP TSG RAN WG2 Meeting #107, XP051767871, R2-1910086, Aug. 26-30, 2019, 4 pages.

"Sidelink HARQ Retransmission in Mode 1," Agenda Item: 11.4.3, Source: ITL, Document for: Discussion and Decision, 3GPP TSG-RAN WG2 Meeting #107, XP051769168, R2-1911411, Aug. 26-30, 2019, 2 pages.

"3rd Generation Partnership Project; Technical Specification Group Radio Access Network; Evolved Universal Terrestrial Radio Access (E-UTRA); Multiplexing and channel coding (Release 15)," 3GPP TS 36.212 V15.7.0, Sep. 2019, 246 pages.

"3rd Generation Partnership Project; Technical Specification Group Radio Access Network; Evolved Universal Terrestrial Radio Access (E-UTRA); Physical layer procedures(Release 15)," 3GPP TS 36.213 V15.7.0, Sep. 2019, 551 pages.

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.7.0, Sep. 2019, 134 pages.

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.7.0, Sep. 2019, 962 pages.

"3rd Generation Partnership Project; Technical Specification Group Radio Access Network; NR;Physical channels and modulation (Release 15)," 3GPP TS 38.211 V15.7.0, Sep. 2019, 97 pages.

"3rd Generation Partnership Project; Technical Specification Group Radio Access Network; NR; Multiplexing and channel coding (Release 15)," 3GPP TS 38.212 V15.3.0, Sep. 2018, 99 pages.

"3rd Generation Partnership Project; Technical Specification Group Radio Access Network; NR; Physical layer procedures for control (Release 15)," 3GPP TS 38.213 V15.7.0, Sep. 2019, 108 pages.

"3rd Generation Partnership Project; Technical Specification Group Radio Access Network; NR; Physical layer procedures for data (Release 15)," 3GPP TS 38.214 V15.7.0, Sep. 2019, 106 pages.

"3rd Generation Partnership Project; Technical Specification Group Radio Access Network; NR; NR and NG-RAN Overall Description; Stage 2 (Release 15)," 3GPP TS 38.300 V15.7.0, Sep. 2019, 99 pages.

"3rd Generation Partnership Project; Technical Specification Group Radio Access Network; NR; Medium Access Control (MAC) protocol specification (Release 15)," 3GPP TS 38.321 V15.7.0, Sep. 2019, 78 pages.

3rd Generation Partnership Project; Technical Specification Group Radio Access Network; NR; Radio Resource Control (RRC) protocol specification (Release 15), 3GPP TS 38.331 V15.7.0, Sep. 2019, 527 pages.

"HARQ Retransmission for NR Sidelink Mode 1," Agenda Item: 11.4.2, Source: LG Electronics Inc., Document for: Discussion and Decision, 3GPP TSG-RAN WG2 #106, R2-1907204 (Resubmission of R2-1905047), Reno, USA, May 13-17, 2019, 2 pages.

* cited by examiner

| Slot | 1 | | | | | | | | | | | | | | 2 | | | | | | | | | | | | | | 3 | | | | | | | | | | | | | | 4 | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Symbol | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| Sidelink grant | | | | | ▨ | ▨ | ▨ | ▨ | ▨ | | | | | | | | | | ▨ | ▨ | ▨ | ▨ | ▨ | | | | | | | | | | ▨ | ▨ | ▨ | ▨ | ▨ | | | | | | | | | | ▨ | ▨ | ▨ | ▨ | ▨ | | | | | |
| Sidelink grant ID | | | | | | 0 | | | | | | | | | | | | | | 1 | | | | | | | | | | | | | | 2 | | | | | | | | | | | | | | 3 | | | | | | | | |

FIG. 2

| Slot | 1 | | | | | | | | | | | | | | 2 | | | | | | | | | | | | | | 3 | | | | | | | | | | | | | | 4 | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Symbol | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| Uplink grant | | | | | | ▨ | ▨ | ▨ | ▨ | | | | | | | | | | ▨ | ▨ | ▨ | ▨ | ▨ | | | | | | | | | | ▨ | ▨ | ▨ | ▨ | ▨ | | | | | | | | | | ▨ | ▨ | ▨ | ▨ | ▨ | | | | | |
| Uplink grant ID | | | | | | 0 | | | | | | | | | | | | | | 1 | | | | | | | | | | | | | | 2 | | | | | | | | | | | | | | 3 | | | | | | | | |
| HARQ process ID | | | | | | 3 | | | | | | | | | | | | | | 4 | | | | | | | | | | | | | | 5 | | | | | | | | | | | | | | 6 | | | | | | | | |

FIG. 4

1701: In a HARQ process, a terminal determines that transmission of sidelink data is completed, where that transmission of sidelink data is completed includes that the sidelink data is successfully transmitted, a quantity of transmissions of the sidelink data reaches a maximum quantity of transmissions, or duration for transmission of the sidelink data reaches maximum transmission duration 1702: The terminal flushes a HARQ buffer of a HARQ process for transmitting the sidelink data

FIG. 17

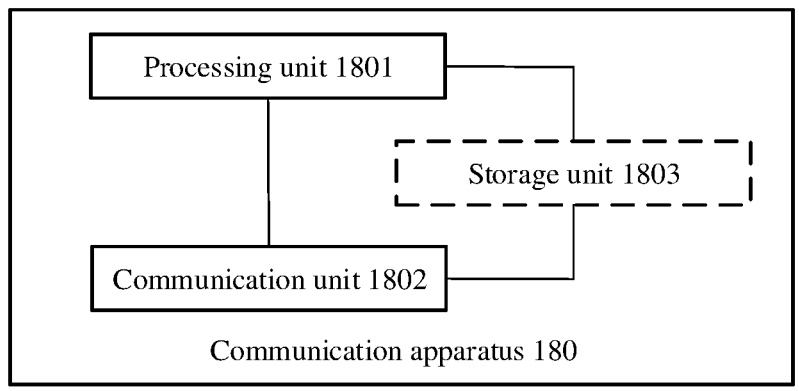

FIG. 18

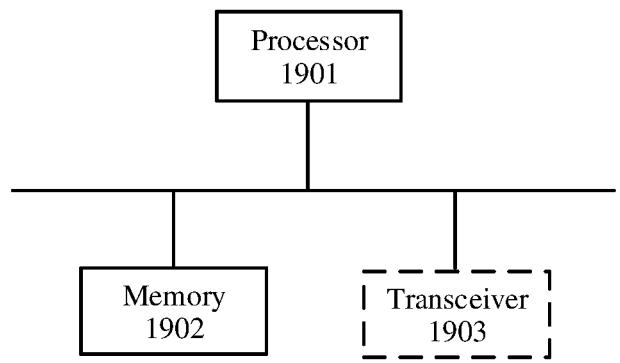

FIG. 19

COMMUNICATION METHOD AND APPARATUS FOR PROVIDING HARQ INFORMATION VIA SIDELINK

CROSS-REFERENCE TO RELATED APPLICATIONS

This application is a continuation of International Application No. PCT/CN2019/109769, filed on Sep. 30, 2019, the disclosure of which is hereby incorporated by reference in its entirety.

TECHNICAL FIELD

This application relates to the field of communication technologies, and in particular, to a communication method and an apparatus.

BACKGROUND

Vehicle to everything (V2X) is a key technology of an intelligent transportation system, and is considered to be one of the fields with great industry potential and clear market requirements in an internet of things system. The vehicle to everything usually refers to a communication network providing vehicle information by using a vehicle-mounted sensor, a vehicle-mounted terminal, or the like, to implement vehicle-to-vehicle (V2V), vehicle-to-infrastructure (V2I), vehicle-to-network (V2N), and vehicle-to-pedestrian (V2P) communication.

The V2X features wide application space, great industry potential, and high social benefits. The V2X is of great significance to promote innovative development of the automobile and information communication industry, build a new model and a new business form for automobile and transportation services, promote innovation and application of technologies, such as self driving, assisted driving, intelligent driving, connected driving, intelligent connected driving, automated driving, and car sharing, and improve traffic efficiency and safety.

Generally, in a V2X scenario, a communication link for direct communication between a terminal and another terminal may be referred to as a sidelink (SL) or a side link. Currently, there is no method for determining a SL hybrid automatic repeat request (HARQ) process identifier (ID).

SUMMARY

Embodiments of this application provide a communication method and an apparatus, to determine a SL HARQ process ID.

To achieve the foregoing objective, embodiments of this application provide the following technical solutions.

According to a first aspect, a communication method is provided. The method includes: A first terminal determines first HARQ information associated with a first sidelink grant, and sends the first HARQ information to a second terminal through a sidelink. For example, the first sidelink grant is for carrying data between the first terminal and the second terminal, the first HARQ information includes a first HARQ process identifier associated with the first sidelink grant, and the sidelink is a wireless direct communication link between the first terminal and the second terminal. According to the method provided in the first aspect, the first terminal may autonomously determine the HARQ process ID associated with the sidelink grant. In this case, the first terminal may determine, based on a requirement, the HARQ process ID associated with the sidelink grant, without being affected by a network device.

In a possible implementation, the first HARQ information further includes new data indication information indicating that corresponding transmission is new transmission or retransmission.

In a possible implementation, the first HARQ process identifier is greater than or equal to 0 and less than N, where N is a maximum quantity of HARQ processes supported by the first terminal on one carrier, and N is an integer greater than 0. In this possible implementation, a quantity of bits occupied by the HARQ process identifier in SCI may be reduced.

In a possible implementation, that a first terminal determines a first HARQ process identifier in first HARQ information associated with a first sidelink grant includes: The first terminal determines, as the first HARQ process identifier, an identifier of an unoccupied HARQ process in a maximum of N HARQ processes supported by the first terminal on one carrier, or when the first sidelink grant preempts a second sidelink grant, the first terminal determines, as the first HARQ process identifier, a HARQ process identifier that is determined by the first terminal and associated with the second sidelink grant.

In a possible implementation, the method further includes: The first terminal stores a correspondence between the first sidelink grant and the first HARQ process identifier, the first terminal stores a correspondence between the first HARQ process identifier and a second HARQ process identifier, or the first terminal stores a correspondence among the first sidelink grant, the first HARQ process identifier, and a second HARQ process identifier. For example, the second HARQ process identifier is a HARQ process identifier determined by the first terminal for the first sidelink grant according to a preset algorithm, or a HARQ process identifier indicated by a network device to the first sidelink grant.

In a possible implementation, the method further includes: The first terminal obtains a third sidelink grant for retransmitting the data, the first terminal determines the first HARQ process identifier as a HARQ process identifier associated with the third sidelink grant, and the first terminal sends second HARQ information to the second terminal. The second HARQ information includes the first HARQ process identifier associated with the third sidelink grant. In this possible implementation, it can be ensured that a receive terminal places newly transmitted data and retransmitted data of same data in a same buffer for processing and that the receive terminal correctly decodes the data.

In a possible implementation, the second HARQ information further includes new data indication information indicating that corresponding transmission is retransmission.

In a possible implementation, that the first terminal obtains a third sidelink grant for retransmitting the data includes: The first terminal determines the third sidelink grant for retransmitting the data, the first terminal sends a request message to the network device, where the request message is for requesting for a resource for retransmitting the data, and the request message includes the second HARQ process identifier, or a resource for transmitting the request message is associated with the second HARQ process identifier, and the first terminal receives a request response from the network device, where the request response includes information indicating the third sidelink grant.

In a possible implementation, that the first terminal determines the third sidelink grant for retransmitting the data includes: The first terminal selects, from a first resource, the third sidelink grant for retransmitting the data. The first resource includes any one or more types of the following resources: a resource of the sidelink, a mode-1 resource of the sidelink, a mode-2 resource of the sidelink, a configured grant resource of the sidelink, a type-1 configured grant resource of the sidelink, a type-2 configured grant resource of the sidelink, a dynamic grant resource of the sidelink, and a configured grant resource set of the sidelink, where the configured grant resource set includes one or more configured grant resources corresponding to one or more configured grant resource indexes.

In a possible implementation, the method further includes: The first terminal receives configuration information from the network device. The configuration information is for configuring a type of a resource included in the first resource. In this possible implementation, the first terminal may determine the first resource, so that the first terminal learns of specific resources for data retransmission.

In a possible implementation, the second HARQ process identifier associated with the first sidelink grant is the same as or different from a fourth HARQ process identifier associated with the third sidelink grant. For example, the fourth HARQ process identifier is a HARQ process identifier determined by the first terminal for the third sidelink grant according to the preset algorithm, or a HARQ process identifier indicated by the network device to the third sidelink grant.

In a possible implementation, the method further includes: The first terminal updates the correspondence between the first sidelink grant and the first HARQ process identifier to a correspondence between the third sidelink grant and the first HARQ process identifier, the first terminal updates the correspondence between the first HARQ process identifier and the second HARQ process identifier to a correspondence between the first HARQ process identifier and the fourth HARQ process identifier, or the first terminal updates the correspondence among the first sidelink grant, the first HARQ process identifier, and the second HARQ process identifier to a correspondence among the third sidelink grant, the first HARQ process identifier, and the fourth HARQ process identifier. For example, the fourth HARQ process identifier is a HARQ process identifier determined by the first terminal for the third sidelink grant according to the preset algorithm, or a HARQ process identifier indicated by the network device to the third sidelink grant.

In a possible implementation, the method further includes: When a HARQ process corresponding to the first HARQ process identifier ends, the first terminal deletes the correspondence between the first sidelink grant and the first HARQ process identifier, the correspondence between the first HARQ process identifier and the second HARQ process identifier, or the correspondence among the first sidelink grant, the first HARQ process identifier, and the second HARQ process identifier. In this possible implementation, a storage resource is released in a timely manner, utilization of the storage resource is improved, and an occupied HARQ process and an unoccupied HARQ process may further be identified.

In a possible implementation, that a HARQ process corresponding to the first HARQ process identifier ends includes any one or more of the following cases: (1) the first terminal receives no feedback of the HARQ process corresponding to the first HARQ process identifier, (2) the first terminal receives a positive acknowledgement of the HARQ process corresponding to the first HARQ process identifier, (3) the first terminal receives only a positive acknowledgement of the HARQ process corresponding to the first HARQ process identifier, (4) the first terminal sends, to the network device, the positive acknowledgement of the HARQ process corresponding to the first HARQ process identifier, (5) duration for data transmission that is associated with the HARQ process corresponding to the first HARQ process identifier reaches maximum transmission duration, (6) a quantity of data transmissions that are associated with the HARQ process corresponding to the first HARQ process identifier reaches a maximum quantity of transmissions, (7) the first terminal releases the HARQ process corresponding to the first HARQ process identifier, (8) the first terminal flushes a HARQ buffer of the HARQ process corresponding to the first HARQ process identifier, (9) another sidelink grant preempts the first sidelink grant, and (10) data transmission that is associated with the HARQ process corresponding to the first HARQ process identifier is completed or ends.

In a possible implementation, the method further includes: When a fourth sidelink grant preempts the first sidelink grant, the first terminal determines third HARQ information associated with the fourth sidelink grant. The third HARQ information includes a fifth HARQ process identifier associated with the fourth sidelink grant.

In a possible implementation, the method further includes: The first terminal updates the correspondence between the first sidelink grant and the first HARQ process identifier to a correspondence between the fourth sidelink grant and the fifth HARQ process identifier, the first terminal updates the correspondence between the first HARQ process identifier and the second HARQ process identifier to a correspondence between the fifth HARQ process identifier and a sixth HARQ process identifier, or the first terminal updates the correspondence among the first sidelink grant, the first HARQ process identifier, and the second HARQ process identifier to a correspondence among the fourth sidelink grant, the fifth HARQ process identifier, and the sixth HARQ process identifier. For example, the sixth HARQ process identifier is a HARQ process identifier determined by the first terminal for the fourth sidelink grant according to the preset algorithm, or a HARQ process identifier indicated by the network device to the fourth sidelink grant.

In a possible implementation, the first sidelink grant belongs to a second resource. The second resource includes any one or more types of the following resources: a resource of the sidelink, a mode-1 resource of the sidelink, a mode-2 resource of the sidelink, a configured grant resource of the sidelink, a type-1 configured grant resource of the sidelink, a type-2 configured grant resource of the sidelink, a dynamic grant resource of the sidelink, and a configured grant resource set of the sidelink, where the configured grant resource set includes one or more configured grant resources corresponding to one or more configured grant resource indexes.

In a possible implementation, before the first terminal determines the first HARQ information for the first sidelink grant, the method further includes: The first terminal determines that there is data to be sent on the first sidelink grant.

According to a second aspect, a communication method is provided. The method includes: A network device generates configuration information that is for configuring a type of a resource included in a first resource, and sends the configuration information to a first terminal. For example, the first resource is for retransmitting data between the first terminal and another terminal, the first terminal communicates with the another terminal through a sidelink, and the sidelink is a wireless direct communication link between the first terminal and the another terminal. For example, the first resource includes any one or more types of the following resources: a resource of the sidelink, a mode-1 resource of the sidelink, a mode-2 resource of the sidelink, a configured grant resource of the sidelink, a type-1 configured grant resource of the sidelink, a type-2 configured grant resource of the sidelink, a dynamic grant resource of the sidelink, and a configured grant resource set of the sidelink, where the configured grant resource set includes one or more configured grant resources corresponding to one or more configured grant resource indexes. According to the method provided in the second aspect, the type of the resource included in the first resource may be configured for the first terminal, so that the first terminal determines the first resource, and the first terminal further learns of specific resources for data retransmission.

In a possible implementation, the first resource is specifically for retransmitting data carried on a second resource between the first terminal and the another terminal. The second resource includes any one or more types of the following resources: a resource of the sidelink, a mode-1 resource of the sidelink, a mode-2 resource of the sidelink, a configured grant resource of the sidelink, a type-1 configured grant resource of the sidelink, a type-2 configured grant resource of the sidelink, a dynamic grant resource of the sidelink, and a configured grant resource set of the sidelink, where the configured grant resource set includes one or more configured grant resources corresponding to one or more configured grant resource indexes.

According to a third aspect, a communication method is provided. The method includes: A first terminal determines first HARQ information associated with a first sidelink grant. For example, the first sidelink grant is for carrying data between the first terminal and a second terminal, and the first HARQ information includes a HARQ process identifier associated with the first sidelink grant. The first terminal obtains a third sidelink grant for retransmitting the data. The first terminal determines second HARQ information associated with the third sidelink grant. The second HARQ information includes a HARQ process identifier associated with the third sidelink grant, and the HARQ process identifier associated with the third sidelink grant is the same as the HARQ process identifier associated with the first sidelink grant. According to the method provided in the third aspect, it can be ensured that a receive terminal places newly transmitted data and retransmitted data of same data in a same buffer for processing and that the receive terminal correctly decodes the data.

In a possible implementation, the first HARQ information further includes new data indication information, and the new data indication information indicates that corresponding transmission is new transmission or retransmission, and/or the second HARQ information further includes new data indication information, and the new data indication information indicates that corresponding transmission is retransmission.

According to a fourth aspect, a resource allocation method is provided. The method includes: A network device starts a first timer associated with a second HARQ process ID of a first terminal, where the second HARQ process ID is a HARQ process ID determined by the network device for a first sidelink grant of the first terminal according to a preset algorithm. When the first timer expires, if the network device receives no positive acknowledgement of sidelink data transmitted in a HARQ process corresponding to the second HARQ process ID, the network device sends resource indication information to the first terminal, where the resource indication information indicates a sidelink resource for retransmitting the sidelink data.

According to a fifth aspect, a HARQ buffer flushing method is provided. The method includes: A terminal determines that transmission of uplink data is completed, and the terminal flushes a HARQ buffer of a HARQ process for transmitting the uplink data. According to the method provided in the fifth aspect, the HARQ buffer may be flushed when the data transmission is completed. This saves buffer space.

According to a sixth aspect, a HARQ buffer flushing method is provided. The method includes: A terminal determines that transmission of sidelink data is completed, where that transmission of sidelink data is completed includes that the sidelink data is successfully transmitted, a quantity of transmissions of the sidelink data reaches a maximum quantity of transmissions, or duration for transmission of the sidelink data reaches maximum transmission duration, and the terminal flushes a HARQ buffer of a HARQ process for transmitting the sidelink data. According to the method provided in the sixth aspect, the HARQ buffer may be flushed when the data transmission is completed. This saves buffer space.

In a possible implementation, that the sidelink data is successfully transmitted includes any one or more of the following cases: The terminal receives no negative acknowledgement of the sidelink data, the terminal receives a positive acknowledgement of the sidelink data, and the terminal receives a positive acknowledgement of the sidelink data and no negative acknowledgement of the sidelink data.

According to a seventh aspect, a communication apparatus is provided, including a processing unit and a communication unit. The processing unit is configured to determine first HARQ information associated with a first sidelink grant, for example, the first sidelink grant is for carrying data between the apparatus and a second terminal, and the first HARQ information includes a first HARQ process identifier associated with the first sidelink grant. The communication unit is configured to send the first HARQ information to the second terminal through a sidelink, and the sidelink is a wireless direct communication link between the apparatus and the second terminal.

In a possible implementation, the first HARQ information further includes new data indication information, and the new data indication information indicates that corresponding transmission is new transmission or retransmission.

In a possible implementation, the first HARQ process identifier is greater than or equal to 0 and less than N, where N is a maximum quantity of HARQ processes supported by the apparatus on one carrier, and N is an integer greater than 0.

In a possible implementation, the processing unit is specifically configured to: determine an identifier of an unoccupied HARQ process in a maximum of N HARQ processes supported by the apparatus on one carrier as the first HARQ process identifier, or when the first sidelink grant preempts a second sidelink grant, determine a HARQ process identifier that is determined by the apparatus and associated with the second sidelink grant as the first HARQ process identifier.

In a possible implementation, the processing unit is further configured to: store a correspondence between the first sidelink grant and the first HARQ process identifier, store a correspondence between the first HARQ process identifier and a second HARQ process identifier, or store a correspondence among the first sidelink grant, the first HARQ process identifier, and a second HARQ process identifier. For example, the second HARQ process identifier is a HARQ process identifier determined by the apparatus for the first sidelink grant according to a preset algorithm, or a HARQ process identifier indicated by a network device to the first sidelink grant.

In a possible implementation, the processing unit is further configured to obtain a third sidelink grant for retransmitting data, the processing unit is further configured to determine the first HARQ process identifier as a HARQ process identifier associated with the third sidelink grant, and the communication unit is further configured to send second HARQ information to the second terminal. The second HARQ information includes a first HARQ process identifier associated with the third sidelink grant.

In a possible implementation, the second HARQ information further includes new data indication information, and the new data indication information indicates that corresponding transmission is retransmission.

In a possible implementation, the processing unit is specifically configured to: determine the third sidelink grant for retransmitting data, send a request message to the network device by using a communication unit, where the request message is for requesting for a resource for retransmitting the data, the request message includes the second HARQ process identifier, or a resource for transmitting the request message is associated with the second HARQ process identifier, and receive a request response from the network device by using the communication unit, where the request response includes information indicating the third sidelink grant.

In a possible implementation, the processing unit is specifically configured to: select, from a first resource, the third sidelink grant for retransmitting the data. The first resource includes any one or more types of the following resources: a resource of the sidelink, a mode-1 resource of the sidelink, a mode-2 resource of the sidelink, a configured grant resource of the sidelink, a type-1 configured grant resource of the sidelink, a type-2 configured grant resource of the sidelink, a dynamic grant resource of the sidelink, and a configured grant resource set of the sidelink, where the configured grant resource set includes one or more configured grant resources corresponding to one or more configured grant resource indexes.

In a possible implementation, the communication unit is further configured to receive configuration information from the network device. The configuration information is for configuring a type of a resource included in the first resource.

In a possible implementation, the second HARQ process identifier associated with the first sidelink grant is the same as or different from a fourth HARQ process identifier associated with the third sidelink grant. For example, the fourth HARQ process identifier is a HARQ process identifier determined by the apparatus for the third sidelink grant according to the preset algorithm, or a HARQ process identifier indicated by the network device to the third sidelink grant.

In a possible implementation, the processing unit is further configured to: update the correspondence between the first sidelink grant and the first HARQ process identifier to a correspondence between the third sidelink grant and the first HARQ process identifier, update the correspondence between the first HARQ process identifier and the second HARQ process identifier to a correspondence between the first HARQ process identifier and the fourth HARQ process identifier, or update the correspondence among the first sidelink grant, the first HARQ process identifier, and the second HARQ process identifier to a correspondence among the third sidelink grant, the first HARQ process identifier, and the fourth HARQ process identifier. For example, the fourth HARQ process identifier is a HARQ process identifier determined by the apparatus for the third sidelink grant according to the preset algorithm, or a HARQ process identifier indicated by the network device to the third sidelink grant.

In a possible implementation, the processing unit is further configured to: when a HARQ process corresponding to the first HARQ process identifier ends, delete the correspondence between the first sidelink grant and the first HARQ process identifier, the correspondence between the first HARQ process identifier and the second HARQ process identifier, or the correspondence among the first sidelink grant, the first HARQ process identifier, and the second HARQ process identifier.

In a possible implementation, that a HARQ process corresponding to the first HARQ process identifier ends includes any one or more of the following cases: (1) The apparatus receives no feedback of the HARQ process corresponding to the first HARQ process identifier, (2) the apparatus receives a positive acknowledgement of the HARQ process corresponding to the first HARQ process identifier, (3) the apparatus receives only a positive acknowledgement of the HARQ process corresponding to the first HARQ process identifier, (4) the apparatus sends, to the network device, the positive acknowledgement of the HARQ process corresponding to the first HARQ process identifier, (5) duration for data transmission that is associated with the HARQ process corresponding to the first HARQ process identifier reaches maximum transmission duration, (6) a quantity of data transmissions that are associated with the HARQ process corresponding to the first HARQ process identifier reaches a maximum quantity of transmissions, (7) the apparatus releases the HARQ process corresponding to the first HARQ process identifier, (8) the apparatus flushes a HARQ buffer of the HARQ process corresponding to the first HARQ process identifier, (9) another sidelink grant preempts the first sidelink grant, and (10) data transmission that is associated with the HARQ process corresponding to the first HARQ process identifier is completed or ends.

In a possible implementation, the processing unit is further configured to: when a fourth sidelink grant preempts the first sidelink grant, determine third HARQ information associated with the fourth sidelink grant. The third HARQ information includes a fifth HARQ process identifier associated with the fourth sidelink grant.

In a possible implementation, the processing unit is further configured to: update the correspondence between the first sidelink grant and the first HARQ process identifier to a correspondence between the fourth sidelink grant and the fifth HARQ process identifier, update the correspondence between the first HARQ process identifier and the second HARQ process identifier to a correspondence between the fifth HARQ process identifier and a sixth HARQ process identifier, or update the correspondence among the first sidelink grant, the first HARQ process identifier, and the second HARQ process identifier to a correspondence among the fourth sidelink grant, the fifth HARQ process identifier, and the sixth HARQ process identifier. For example, the sixth HARQ process identifier is a HARQ process identifier determined by the apparatus for the fourth sidelink grant according to the preset algorithm, or a HARQ process identifier indicated by the network device to the fourth sidelink grant.

In a possible implementation, the first sidelink grant belongs to a second resource, and the second resource includes any one or more types of the following resources: a resource of the sidelink, a mode-1 resource of the sidelink, a mode-2 resource of the sidelink, a configured grant resource of the sidelink, a type-1 configured grant resource of the sidelink, a type-2 configured grant resource of the sidelink, a dynamic grant resource of the sidelink, and a configured grant resource set of the sidelink, where the configured grant resource set includes one or more configured grant resources corresponding to one or more configured grant resource indexes.

In a possible implementation, the processing unit is further configured to determine that there is data to be sent on the first sidelink grant.

According to an eighth aspect, a communication apparatus is provided, including a processing unit and a communication unit. The processing unit is configured to generate configuration information. The configuration information is for configuring a type of a resource included in a first resource, the first resource is for retransmitting data between a first terminal and another terminal, the first terminal communicates with the another terminal through a sidelink, and the sidelink is a wireless direct communication link between the first terminal and the another terminal. The communication unit is configured to send the configuration information to the first terminal. For example, the first resource includes any one or more types of the following resources: a resource of the sidelink, a mode-1 resource of the sidelink, a mode-2 resource of the sidelink, a configured grant resource of the sidelink, a type-1 configured grant resource of the sidelink, a type-2 configured grant resource of the sidelink, a dynamic grant resource of the sidelink, and a configured grant resource set of the sidelink, where the configured grant resource set includes one or more configured grant resources corresponding to one or more configured grant resource indexes.

In a possible implementation, the first resource is specifically for retransmitting data carried on a second resource between the first terminal and the another terminal. The second resource includes any one or more types of the following resources: a resource of the sidelink, a mode-1 resource of the sidelink, a mode-2 resource of the sidelink, a configured grant resource of the sidelink, a type-1 configured grant resource of the sidelink, a type-2 configured grant resource of the sidelink, a dynamic grant resource of the sidelink, and a configured grant resource set of the sidelink, where the configured grant resource set includes one or more configured grant resources corresponding to one or more configured grant resource indexes.

According to a ninth aspect, a communication apparatus is provided, including a processing unit. The processing unit is configured to determine first HARQ information associated with a first sidelink grant. For example, the first sidelink grant is for carrying data between the apparatus and a second terminal, and the first HARQ information includes a HARQ process identifier associated with the first sidelink grant. The processing unit is further configured to obtain a third sidelink grant for retransmitting the data. The processing unit is further configured to determine second HARQ information associated with the third sidelink grant. The second HARQ information includes a HARQ process identifier associated with the third sidelink grant. The HARQ process identifier associated with the third sidelink grant is the same as the HARQ process identifier associated with the first sidelink grant.

In a possible implementation, the first HARQ information further includes new data indication information, and the new data indication information indicates that corresponding transmission is new transmission or retransmission, and/or the second HARQ information further includes new data indication information, and the new data indication information indicates that corresponding transmission is retransmission.

According to a tenth aspect, a resource allocation apparatus is provided, including a processing unit and a communication unit. The processing unit is configured to start a first timer associated with a second HARQ process ID of a first terminal, and the second HARQ process ID is a HARQ process ID determined by the apparatus for a first sidelink grant of the first terminal according to a preset algorithm. When the first timer expires, if the apparatus receives no positive acknowledgement of sidelink data transmitted in a HARQ process corresponding to the second HARQ process ID, the communication unit sends resource indication information to the first terminal, where the resource indication information indicates a sidelink resource for retransmitting the sidelink data.

According to an eleventh aspect, a HARQ buffer flushing apparatus is provided, including: a processing unit, configured to: determine that transmission of uplink data is completed, and flush a HARQ buffer of a HARQ process for transmitting the uplink data.

According to a twelfth aspect, a HARQ buffer flushing apparatus is provided, including: a processing unit, configured to determine that transmission of sidelink data is completed, and flush a HARQ buffer of a HARQ process for transmitting the sidelink data. That transmission of sidelink data is completed includes that the sidelink data is successfully transmitted, a quantity of transmissions of the sidelink data reaches a maximum quantity of transmissions, or duration for transmission of the sidelink data reaches maximum transmission duration.

In a possible implementation, that the sidelink data is successfully transmitted includes any one or more of the following cases: The terminal receives no negative acknowledgement of the sidelink data, the terminal receives a positive acknowledgement of the sidelink data, and the terminal receives a positive acknowledgement of the sidelink data and no negative acknowledgement of the sidelink data.

According to a thirteenth aspect, a communication apparatus is provided, including a processor. The processor is connected to a memory, the memory is configured to store computer-executable instructions, and the processor executes the computer-executable instructions stored in the memory, to implement the method provided in any one of the first aspect to the sixth aspect. For example, the memory and the processor may be integrated together, or may be independent components. If the memory and the processor are independent components, the memory may be located inside the communication apparatus, or may be located outside the communication apparatus.

In a possible implementation, the processor includes a logic circuit and at least one of an input interface and an output interface. For example, the output interface is configured to perform a sending action in a corresponding method, and the input interface is configured to perform a receiving action in the corresponding method.

In a possible implementation, the communication apparatus further includes a communication interface and a communication bus. The processor, the memory, and the communication interface are connected through the communication bus. The communication interface is configured to perform sending and receiving actions in a corresponding method. The communication interface may also be referred to as a transceiver. Optionally, the communication interface includes at least one of a transmitter and a receiver. In this case, the transmitter is configured to perform a sending action in a corresponding method, and the receiver is configured to perform a receiving action in the corresponding method.

In a possible implementation, the communication apparatus exists in a product form of a chip.

According to a fourteenth aspect, a communication system is provided, including the communication apparatus provided in the seventh aspect, and the communication apparatus provided in the eighth aspect.

According to fifteenth aspect, a computer-readable storage medium including instructions is provided. When the instructions are run on a computer, the computer is enabled to perform the method provided in any one of the first aspect to the sixth aspect.

According to a sixteenth aspect, a computer program product including instructions is provided. When the instructions are run on a computer, the computer is enabled to perform the method provided in any one of the first aspect to the sixth aspect.

For a technical effect brought by any implementation of the seventh aspect to the sixteenth aspect, refer to a technical effect brought by a corresponding implementation of the first aspect to the sixth aspect. Details are not described herein again.

BRIEF DESCRIPTION OF THE DRAWINGS

FIG. 2 is a schematic diagram of a sidelink grant according to an embodiment of this application;

FIG. 4 is a schematic diagram of uplink grants and corresponding HARQ process IDs of the uplink grants according to an embodiment of this application;

FIG. 16 and FIG. 17 both are a flowchart of a HARQ buffer flushing method according to an embodiment of this application;

FIG. 18 is a schematic diagram of composition of a communication apparatus according to an embodiment of this application; and FIG. 19 and FIG. 20 both are a schematic diagram of a hardware structure of a communication apparatus according to an embodiment of this application.

DETAILED DESCRIPTION OF ILLUSTRATIVE EMBODIMENTS

In descriptions of this application, unless otherwise specified, "/" means "or". For example, A/B may represent A or B. "And/or" in this specification describes only an association relationship for describing associated objects and represents that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and terms such as "first" and "second" do not indicate a definite difference.

It should be noted that, in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Specifically, use of "example" or "for example" is intended to present a related concept in a specific manner.

A method provided in embodiments of this application is applicable to but is not limited to the following fields: device-to-device (D2D), V2X, unmanned driving (unmanned driving), automated driving (ADS), driver assistance (ADAS), intelligent driving (intelligent driving), connected driving (connected driving), intelligent network driving (intelligent network driving), car sharing (car sharing), and the like.

Figure 1:
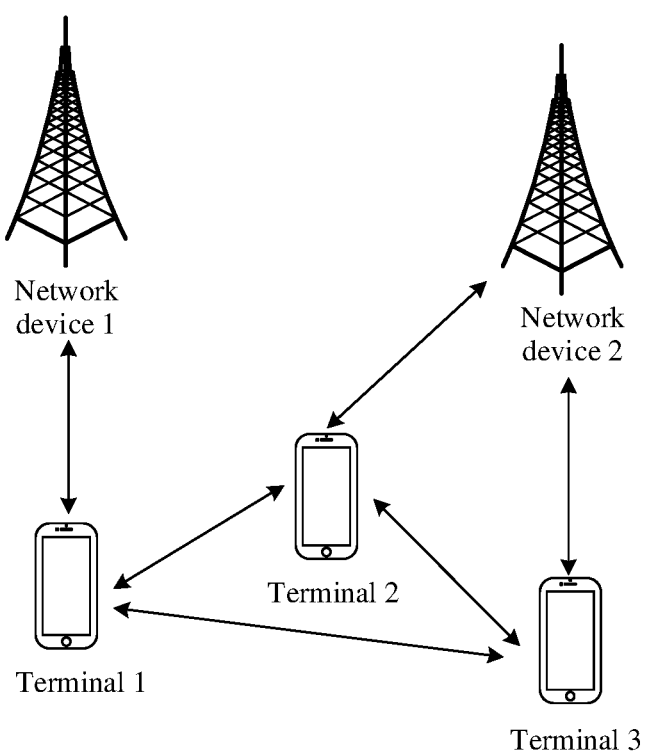
FIG. 1 is a schematic diagram of a communication scenario according to an embodiment of this application.

Network elements in this application include a network device and a terminal in a communication system. Refer to FIG. 1. A method provided in an embodiment of this application mainly relates to communication between terminals, and communication between a terminal and a network device.

The communication system in embodiments of this application includes but is not limited to a long term evolution (LTE) system, a fifth generation (5G) system, a new radio (NR) system, and a wireless local area network (WLAN) system and a future evolution system or a plurality of converged communication systems. The 5G system may be a non-standalone (NSA) 5G system or a standalone (SA) 5G system.

The network device in embodiments of this application is an entity that is on a network side and that is configured to send a signal, receive a signal, or send a signal and receive a signal. The network device may be an apparatus that is deployed in a radio access network (RAN) and that provides a wireless communication function for the terminal, for example, may be a transmission reception point (TRP), a base station, various forms of control nodes (for example, a network controller, a radio controller (for example, a radio controller in a cloud radio access network (CRAN) scenario)), or the like. Specifically, the network device may be macro base stations, micro base stations (also referred to as small cells), relay stations, access points (AP), or the like in various forms, or may be an antenna panel of a base station. The control node may be connected to a plurality of base stations, and configure resources for a plurality of terminals covered by the plurality of base stations. In systems using different radio access technologies, names of a device having a base station function may be different. For example, the device may be referred to as an evolved NodeB (evolved NodeB, eNB or eNodeB) in the LTE system, or may be referred to as a next generation node base station (gNB) in the 5G system or the NR system. A specific name of the base station is not limited in this application. The network device may alternatively be a network device in a future evolved public land mobile network (PLMN) or the like.

The terminal in this embodiment of this application is an entity that is on a user side and that is configured to receive a signal or send a signal, or receive a signal and send a signal. The terminal is configured to provide a user with one or more of a voice service and a data connectivity service. Alternatively, the terminal may be referred to as user equipment (UE), a terminal device, an access terminal, a subscriber unit, a subscriber station, a mobile station, a remote station, a remote terminal, a mobile device, a user terminal, a wireless communication device, a user agent, or a user apparatus. The terminal may be a V2X device, for example, a smart car (smart car or intelligent car), a digital car (digital car), an unmanned car (unmanned car, driverless car, pilotless car, or automobile), an automatic car (self-driving car or autonomous car), a pure electric vehicle (pure EV or Battery EV), a hybrid electric vehicle (HEV), a range extended electric vehicle (REEV), a plug-in hybrid electric vehicle (PHEV), a new energy vehicle (new energy vehicle), or a road site unit (RSU). Alternatively, the terminal may be a D2D device, for example, an electricity meter or a water meter. Alternatively, the terminal may be a mobile station (MS), a subscriber unit (subscriber unit), an unmanned aerial vehicle, an internet of things (IoT) device, a station (ST) in a WLAN, a cellular phone (cellular phone), a smartphone (smartphone), a cordless phone, a wireless data card, a tablet computer, a session initiation protocol (SIP) phone, a wireless local loop (WLL) station, a personal digital assistant (PDA) device, a laptop computer (laptop computer), a machine type communication (MTC) terminal, a handheld device with a wireless communication function, a computing device or another processing device connected to a wireless modem, a vehicle-mounted device, or a wearable device (which may also be referred to as a wearable intelligent device). Alternatively, the terminal may be a terminal in a next generation communication system, for example, a terminal in a 5G system, a terminal in a future evolved PLMN, or a terminal in an NR system.

To make embodiments of this application clearer, the following briefly describes concepts and some content that are related to embodiments of this application.

1. Uplink (UL), Downlink (DL), and SL

A wireless communication link used by a terminal to send data (that is, uplink data) to a network device may be referred to as an UL. A wireless communication link used by a network device to send data (that is, downlink data) to a terminal may be referred to as a DL. An UL interface and a DL interface may be collectively referred to as a Uu interface. Therefore, the UL and DL may be collectively referred to as a Uu interface link.

A communication link for direct communication between terminals may be referred to as a SL. The SL may also be referred to as a side link. Data transmitted between terminals may be referred to as SL data.

For example, the data in this embodiment of this application may be understood as a transport block (TB) or a medium access control (MAC) protocol data unit (PDU). The data may also be referred to as a data packet or a packet.

2. SL Resource Allocation Mode

SL transmission resource used by a transmit terminal in two terminals may be determined in any one of the following manner A and manner B.

Manner A: Scheduling by a Network Device

Modes in which the network device schedules the SL transmission resource may include a mode-1 (mode 1) resource allocation mode (a name in NR) or a mode-3 (mode 3) resource allocation mode (a name in LTE).

There are the following two types of SL transmission resources scheduled by the network device.

Type 1: Configured Grant (CG) Resources

In this case, the network device does not always need to allocate a resource for each data transmission of the transmit terminal. After the network device allocates a resource to the transmit terminal at a time, the transmit terminal may use the allocated resource within a future period of time. This features "the resource is allocated once but used for a plurality of times". Specifically, the network device may configure a periodically occurring time domain resource for the transmit terminal. For example, refer to FIG. 2. A time domain resource that occurs for the first time in the periodically occurring time domain resource is a symbol 4 to a symbol 9 of a slot 1, and a periodicity is one slot. If a time domain resource that occurs each time is a SL grant (a sidelink grant for short below), it may be understood that FIG. 2 shows four sidelink grants and that one sidelink grant corresponds to one sidelink grant ID. In this case, sidelink grant IDs corresponding to the four sidelink grants are a sidelink grant 0, a sidelink grant 1, a sidelink grant 2, and a sidelink grant 3.

The CG resources may include a type-1 (type 1) CG (SL configured grant type-1) resource, a type-2 (type 2) CG (SL configured grant type-2) resource, a grant-free (SL grant free) resource, and a semi-persistent scheduling (SL SPS) resource. The type-1 CG resource may be a SL transmission resource directly configured by the network device for the transmit terminal based on radio resource control (RRC) signaling, and the transmit terminal may directly use the CG resource to transmit data without additional activation. The type-2 CG resource may be a SL transmission resource whose periodicity is defined by the network device based on the RRC signaling. The SL transmission resource is then activated based on downlink control information (DCI) in a physical downlink control channel (PDCCH). The transmit terminal can use the SL transmission resource only after the SL transmission resource is activated, instead of directly using the SL transmission resource to transmit data. The grant-free resource may be a SL transmission resource directly configured by the network device for the transmit terminal based on the RRC signaling, and the transmit terminal may directly use the SL transmission resource to transmit data without additional activation. The semi-persistent scheduling resource may be a SL transmission resource whose periodicity is defined by the network device based on the RRC signaling. The SL transmission resource is then activated based on DCI in a PDCCH. The transmit terminal can use the SL transmission resource only after the SL transmission resource is activated, instead of directly using the SL transmission resource to transmit data.

Currently, only one CG resource is supported on one carrier in an uplink. A plurality of CG resources are supported on one carrier in a SL, and different CG resources may correspond to different indexes. For example, CG resources whose indexes are 1, 2, and 3 may be respectively denoted as CG1, CG2, and CG3.

Type 2: Dynamic Grant (DG) Resources

In this case, the network device needs to allocate a resource for each data transmission of the transmit terminal. This features "allocation once for use once". For example, the dynamic grant resources may be SL transmission resources dynamically allocated by the network device to the transmit terminal based on DCI. The DCI may be carried on a PDCCH.

A major difference between a DG and a CG lies in resource allocation flexibility and resource allocation overheads. The DG means that the network device allocates a grant to each data transmission of the transmit terminal. In this case, resource allocation is flexible, but resource allocation overheads are large. The CG means that a grant allocated by the network device once may be used by the transmit terminal for a plurality of times. In this case, resource allocation overheads are small, but resource allocation is inflexible because there is no change or adjustment to an allocated resource within a long period of time. DGs are usually allocated by using a physical channel (for example, a PDCCH). In this case, resources are allocated fast. CGs are usually configured by using higher-layer signaling (for example, RRC signaling) or higher-layer signaling (for example, RRC signaling) plus a physical channel (for example, a PDCCH). In this case, resources are allocated slowly.

Manner B: Autonomously Determining by the Transmit Terminal

Modes in which the transmit terminal autonomously determines the SL transmission resource may include a mode-2 (mode 2) resource allocation mode (a name in NR) or a mode-4 (mode 4) resource allocation mode (a name in LTE).

In Manner B, when the transmit terminal is within a communication coverage area of the network device, the network device may configure a SL resource pool for the transmit terminal based on a system information block (SIB) message or dedicated RRC signaling, and the transmit terminal may autonomously obtain the SL transmission resource from the SL resource pool to send a control signal and/or a data signal to a receive terminal. In Manner B, when the transmit terminal is outside the communication coverage area of the network device, the transmit terminal may autonomously obtain the SL transmission resource from a pre-configured SL resource pool to send a control signal and/or a data signal to the receive terminal.

When obtaining the SL transmission resource from the SL resource pool, the transmit terminal may sense or contend for the SL transmission resource. Specifically, the transmit terminal contends with another terminal to obtain an appropriate SL transmission resource in the SL resource pool, so as to send the control signal and/or the data signal. A higher priority of a to-be-transmitted V2X service or data in the transmit terminal indicates a greater opportunity for the transmit terminal to obtain, through contending, an appropriate SL transmission resource in the SL resource pool.

In LTE V2X, a mode 3 and a mode 4 cannot coexist. In NR V2X, a mode 1 and a mode 2 can coexist.

The foregoing SL resources may be classified into a plurality of types of resources, and specifically include the following types of resources:

(1) Mode-1 resource of the SL: SL transmission resources scheduled by a network device may include a resource configured in the foregoing mode-1 resource allocation mode, or a resource configured in the foregoing mode-3 resource allocation mode. The resource configured in the foregoing mode-1 resource allocation mode or the resource configured in the foregoing mode-3 resource allocation mode may include a CG resource of the SL and/or a DG resource of the SL.

(2) Mode-2 resource of the SL: SL transmission resources that the terminal needs to select, contend for, or sense by itself may include: a resource configured in the foregoing mode-2 resource allocation mode, or a resource configured in the foregoing mode-4 resource allocation mode.

(3) Type-1 CG resource of the SL: A CG resource that can be directly used without being activated may include the foregoing type-1 CG resource and/or the foregoing grant-free resource.

(4) Type-2 CG resource of the SL: A CG resource that cannot be directly used by a terminal but can be used only after being activated may include the foregoing type-2 CG resource and/or the foregoing semi-persistent scheduling resource.

(5) Resources of the SL include a mode-1 resource of the SL and/or a mode-2 resource of the SL.

(6) CG resources of the SL include a type-1 CG resource of the SL and/or a type-2 CG resource of the SL.

(7) DG resource of the SL is a SL transmission resource dynamically allocated by the network device to the terminal based on DCI.

(8) CG resource set of the SL: The CG resource set includes one or more CG resources corresponding to one or more CG resource indexes, for example, a resource set including CG1, CG2, and CG3.

It should be noted that different CG resource sets are different types of resources. For example, a CG resource set 1 includes resources of one type, and a CG resource set 2 includes resources of another type.

3. HARQ

HARQ is a technology combining forward error correction (or forward error correction code) (FEC) and an automatic repeat request (automatic repeat request, ARQ) method.

FEC means: If data sent by a transmit end includes forward error correction code or redundancy information, after receiving the data, a receive end can find an error through check (for example, cyclic redundancy check (CRC)), and then correct the error based on the forward error correction code or the redundancy information. In this way, the transmit end can reduce a quantity of retransmissions (that is, data retransmissions).

ARQ means that the receive end determines correctness of received data through check (for example, CRC check). If correct data is received, the receive end sends a positive acknowledgement (ACK) to notify the transmit end that correct data is received. If incorrect data is received, the receive end sends a negative acknowledgement (NACK) to notify the transmit end that incorrect data is received. When receiving the NACK, the transmit end may retransmit the data to the receive end. The ACK and the NACK are HARQ feedbacks.

LTE V2X supports only a broadcast service. Therefore, a SL HARQ feedback is not supported. NR V2X supports unicast, groupcast, and broadcast services, and the SL HARQ feedback.

The following specifically describes HARQ-related content by using three parts: (a) to (c).

(a) HARQ Process (HARQ Process)

Figure 3:
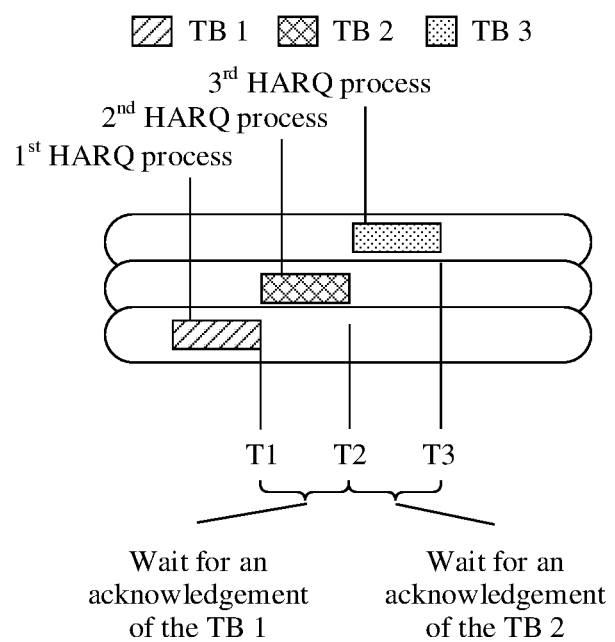
FIG. 3 is a schematic diagram of concurrent HARQ processes according to an embodiment of this application.

A stop-and-wait protocol (stop-and-wait protocol) is used in the HARQ to send data. In the stop-and-wait protocol, after sending a transport block (TB), a transmit end stops and waits for acknowledgement information. A receive end may feed back an ACK or a NACK of the TB. However, the transmit end stops and waits for an acknowledgement after each transmission, resulting in a very low throughput. Therefore, a plurality of parallel HARQ processes may be used: When the transmit end waits for an acknowledgement in one HARQ process, the transmit end may continue sending data by using another HARQ process. For example, refer to FIG. 3. A terminal sends a TB 1 by using a first HARQ process, completes sending of the TB 1 at a moment T1, receives a HARQ feedback of the TB 1 at a moment T2, and waits for an acknowledgement of the TB 1 within a period of time from T1 to T2. Within the period of time for waiting for the acknowledgement, the terminal may send a TB 2 by using a second HARQ process, complete sending of the TB 2 at the moment T2, receive a HARQ feedback of the TB 2 at a moment T3, and wait for an acknowledgement of the TB 2 within a period of time from T2 to T3. Within the time of period for waiting for the acknowledgement, the terminal may send a TB 3 by using a third HARQ process.

It should be noted that one TB or more TBs (for example, in a case of spatial multiplexing) can be processed in one transmission time interval (TTI) in each HARQ process.

One sidelink grant is generally associated with one HARQ process. Specifically, a plurality of sidelink grants included in one bundle are associated with a same HARQ process. To be specific, transmission (for example, uplink transmission, or sidelink transmission) on the plurality of sidelink grants included in one bundle corresponds to the same HARQ process.

For example, transmission in one bundle may be understood as that one TB needs to be retransmitted for one or more times after one new transmission, and a plurality of transmissions of a same TB are associated with a same HARQ process at a transmit end. For a receive end, data received for a plurality of times in a same HARQ process may be placed in a same buffer (for example, a HARQ buffer (buffer) or a soft buffer (soft buffer)), to perform soft combined decoding.

One HARQ process is identified by using one HARQ process ID.

Optionally, descriptions about the HARQ process of the terminal in embodiments of this application are all specific for one carrier. When there are a plurality of carriers, a case of each carrier is the same as that in this application document.

(b) Mechanism for Processing Newly Transmitted Data and Retransmitted Data by the Receive End There is a corresponding buffer (for example, a HARQ buffer or a soft buffer) at a receive end in each HARQ process, to perform soft combined decoding on received data.

After receiving newly transmitted data sent by the transmit end by using one HARQ process, the receive end may place the newly transmitted data received into the buffer (for example, a HARQ buffer or a soft buffer) corresponding to the HARQ process, and perform decoding on the data. If decoding fails, when retransmitted data of the newly transmitted data is received again, the received retransmitted data and the newly transmitted data previously stored in the buffer may be combined, put into the buffer, and decoded again. This manner may be referred to as soft combined decoding. Compared with separate decoding (that is, data transmitted each time is decoded separately and is not combined with the previous data for decoding), this manner increases a decoding success rate. Similarly, if the decoding still fails, the foregoing process may continue to be repeated. Newly received retransmitted data and data in the buffer are combined, and decoded again.

The retransmitted data and the newly transmitted data at the transmit end may be of a same redundancy version (RV) or different RVs of a same TB.

(c) Mechanism for Determining a HARQ Process ID in Uplink Transmission

One CG resource is supported on one carrier in an UL. A CG resource supports a maximum of 16 HARQ processes. For the CG resource, a formula specified in a protocol (For details, refer to Clause 5.4.1 in 3GPP TS 38.321: "NR, Medium Access Control (MAC); Protocol specification") (This formula is referred to as a preset algorithm 1) may be used to calculate a HARQ process ID associated with each uplink grant on the CG resource, where a maximum range of the HARQ process ID ranges from 0 to 15. Both the terminal and a network device may calculate, according to the preset algorithm 1, the HARQ process ID corresponding to each uplink grant. For a DG resource, the network device may indicate, to the terminal based on DCI, the HARQ process ID associated with each uplink grant.

For example, when a subcarrier spacing (SCS) is 15 kHz, for an UL CG resource, a start system frame number (SFN) is 5, a start slot is a slot 1, a start symbol is a symbol 4, an uplink grant occupies six symbols, a periodicity is one slot, and a quantity of HARQ processes available for the CG resource is 16. In this case, a HARQ process ID associated with each uplink grant may be obtained through calculation according to the preset algorithm 1. For details, refer to FIG. 4.

For a SL, a plurality of CG resources coexist on one carrier. In this case, a HARQ process ID associated with each sidelink grant may be calculated in the following Manner C or Manner D (in the following content, a HARQ process is a SL HARQ process, and a HARQ process ID is a SL HARQ process ID).

Manner C

For each CG resource, a HARQ process ID associated with each sidelink grant in the CG resource may be calculated according to a formula similar to the preset algorithm 1.

When the HARQ process ID associated with each sidelink grant is determined in Manner C, HARQ process IDs associated with sidelink grants on different CG resources may overlap.

In addition, a HARQ process ID associated with each sidelink grant in a mode-1 resource of the SL may be indicated by a network device to a terminal or calculated by the terminal according to a preset rule (for example, the foregoing preset algorithm 1). A HARQ process ID associated with each sidelink grant in a mode-2 resource of the SL may be determined by the terminal. Therefore, the HARQ process IDs associated with the sidelink grants in the mode-1 resource of the SL and the mode-2 resource of the SL may overlap.

Optionally, for a DG resource, the network device may determine a HARQ process ID, and indicate the HARQ process ID to the terminal based on DCI. The HARQ process ID and a HARQ process ID associated with another sidelink grant may overlap.

Data transmitted on sidelink grants of different resources (for example, different CG resources, or a mode-1 resource and a mode-2 resource, or a DG resource and a CG resource) may be different data. If HARQ process IDs associated with the sidelink grants on the different resources are the same, it means that a receive terminal may perform soft combination on the different data, resulting in a decoding error.

Manner D

HARQ process IDs associated with sidelink grants on different CG resources are calculated according to a preset algorithm 2. The preset algorithm 2 may be adding an offset (offset) to the preset algorithm 1. The network device may configure a quantity of HARQ processes and an offset that are available for each CG resource, so that HARQ process IDs associated with sidelink grants on different CG resources are different. For example, for CG1, an available quantity of HARQ processes is 4, and an available offset 1 is 0, for CG2, an available quantity of HARQ processes is 8, and an available offset 2 is 4. In this case, HARQ process IDs available for CG1 are 0 to 3, and HARQ process IDs available for CG2 are 4 to 11. In this way, the HARQ process IDs for CG1 are distinguished from the HARQ process IDs for CG2.

In addition, another method may be used to associate the sidelink grant on the mode-1 resource of the SL and the sidelink grant on the mode-2 resource of the SL with different HARQ process IDs.

In conclusion, an objective of Manner D is to ensure that sidelink grants on different resources (for example, different CG resources, or a mode-1 resource and a mode-2 resource, or a DG resource and a CG resource) are associated with different HARQ process IDs. If a range of available HARQ process IDs on all resources is 0 to M−1, a value of M (for example, M=24 or M=32) may be greater than a maximum quantity (which is denoted as N, for example, N=8 or N=16) of HARQ processes supported by the terminal on one carrier. In this case, the terminal may select N HARQ process IDs from the M HARQ process IDs to transmit data simultaneously. The maximum quantity of HARQ processes supported by the terminal on the carrier may be understood as a maximum quantity of HARQ processes simultaneously supported by the terminal on the carrier.

A method for calculating the HARQ process ID in Manner D has the following problems.

Problem 1: A HARQ process ID in SCI occupies a large quantity of bits (bit).

It should be noted that, when sending data, a transmit terminal may include, in SL control information (SCI) for scheduling the data, a HARQ process ID corresponding to a HARQ process used by the transmit terminal. In this case, for example, if the network device configures eight CG resources for the terminal, each CG resource supports two HARQ processes, and the terminal allocates 16 HARQ processes to the mode-2 resource of the SL. In this case, a range of HARQ process IDs of the terminal ranges from 0 to 31. A HARQ process ID in the SCI needs to occupy five bits. A larger HARQ process ID range of the terminal needs to occupy more bits, increasing SCI transmission load.

Problem 2: The following three specific retransmission-related problems are included:

(1) A retransmission latency cannot be ensured.

It should be noted that HARQ processes used for newly transmitted data and retransmitted data of same data need to correspond to a same HARQ process ID, so that the receive terminal performs soft combination on newly transmitted data and retransmitted data. In this case, in the method for calculating the HARQ process ID in Manner D, the same data can be newly transmitted and retransmitted only on sidelink grants associated with a same HARQ process ID in one CG resource, and a retransmission latency cannot be ensured. For example, refer to FIG. 5, if the network device configures seven CG resources for the terminal, each CG resource supports two HARQ processes, and HARQ process IDs corresponding to the CG resources are 0 to 13. The network device also configures one DG resource for the terminal, and indicates that a HARQ process ID corresponding to the DG resource is 14. In addition, HARQ process IDs corresponding to mode-2 resources of the SL are 16 to 31. Small squares in FIG. 5 to FIG. 8, FIG. 11, and FIG. 13 are sidelink grants, and numbers next to the small squares are HARQ process IDs corresponding to the sidelink grants. If the transmit terminal newly transmits a piece of data to the receive terminal in a HARQ process 0, and the receive terminal feeds back a NACK of the HARQ process 0 to the transmit terminal at T1, the transmit terminal also needs to retransmit the data in the HARQ process 0. However, a time interval between sidelink grants associated with the HARQ process 0 is long, resulting in a long retransmission latency.

(2) Different CG resources cannot share HARQ process IDs.

If three CG resources are configured for a service to meet latency and reliability requirements of the service, the three CG resources share a HARQ process ID, and also share new transmission and retransmission. However, the method for calculating the HARQ process ID in the current Manner D cannot ensure that the three CG resources share the HARQ process ID.

(3) Data transmitted on the DG resource cannot be retransmitted.

Figure 5:
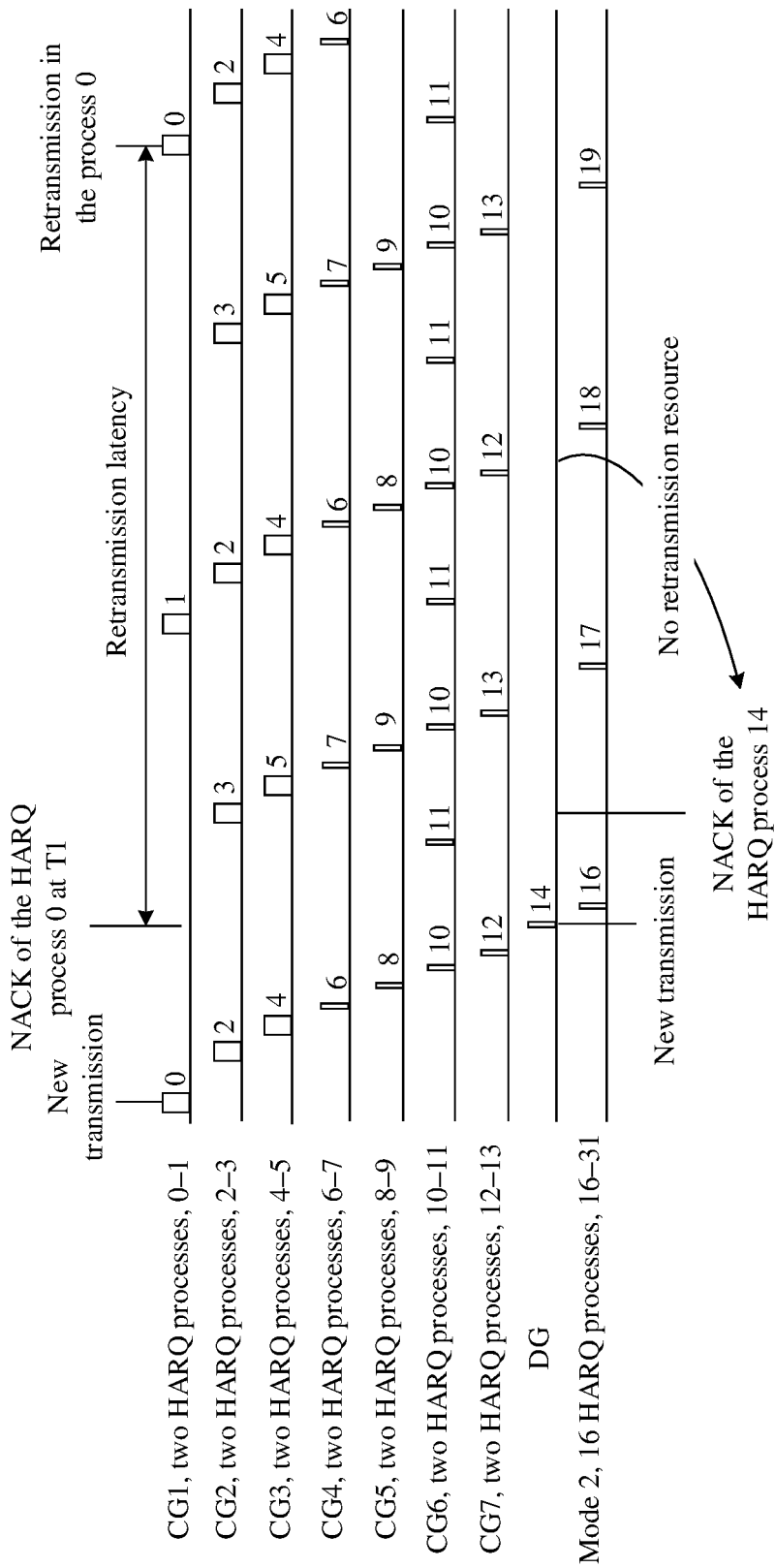
FIG. 5 to FIG. 8 are schematic diagrams of sidelink grants in a plurality of SL transmission resources and associated HARQ process IDs of the sidelink grants according to an embodiment of this application.

For example, refer to the HARQ process 14 in FIG. 5. The HARQ process ID associated with the DG resource is independent. Therefore, the data transmitted on the DG resource cannot be retransmitted. The transmit terminal can request only a retransmission resource from the network device, resulting in a large latency.

Problem 3: A quantity of HARQ processes available for the transmit terminal at a moment may be limited.

Figure 6:
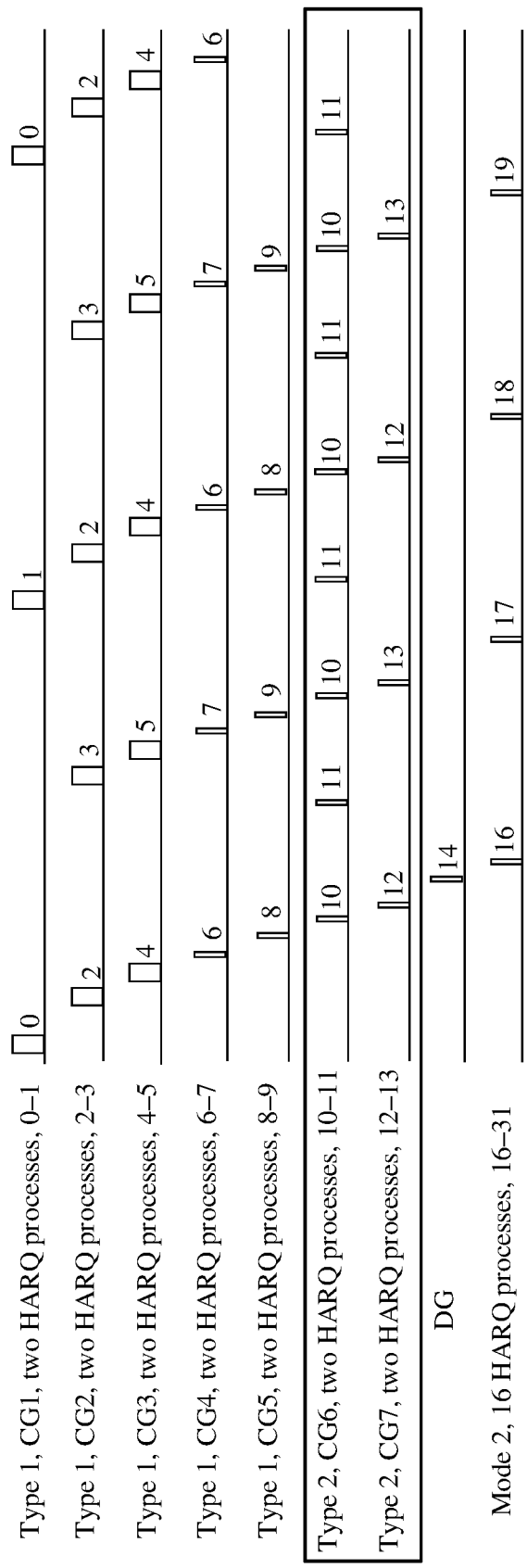

For example, refer to FIG. 6. The network device allocates five type-1 CGs and two type-2 CGs to the transmit terminal. Each type-1 CG supports two HARQ processes, and each type-2 CG supports two HARQ processes. In this case, if the transmit terminal can transmit data by using only the type-2 CG and cannot transmit data by using the type-1 CG, the transmit terminal can use only four HARQ processes (that is, the HARQ process 10 to the HARQ process 13) to transmit the data. This limits a quantity of HARQ processes available for the transmit terminal at the moment, and reduces data transmission efficiency.

Problem 4: Data cannot be transmitted on some resources because of improper configuration.

Figure 7:
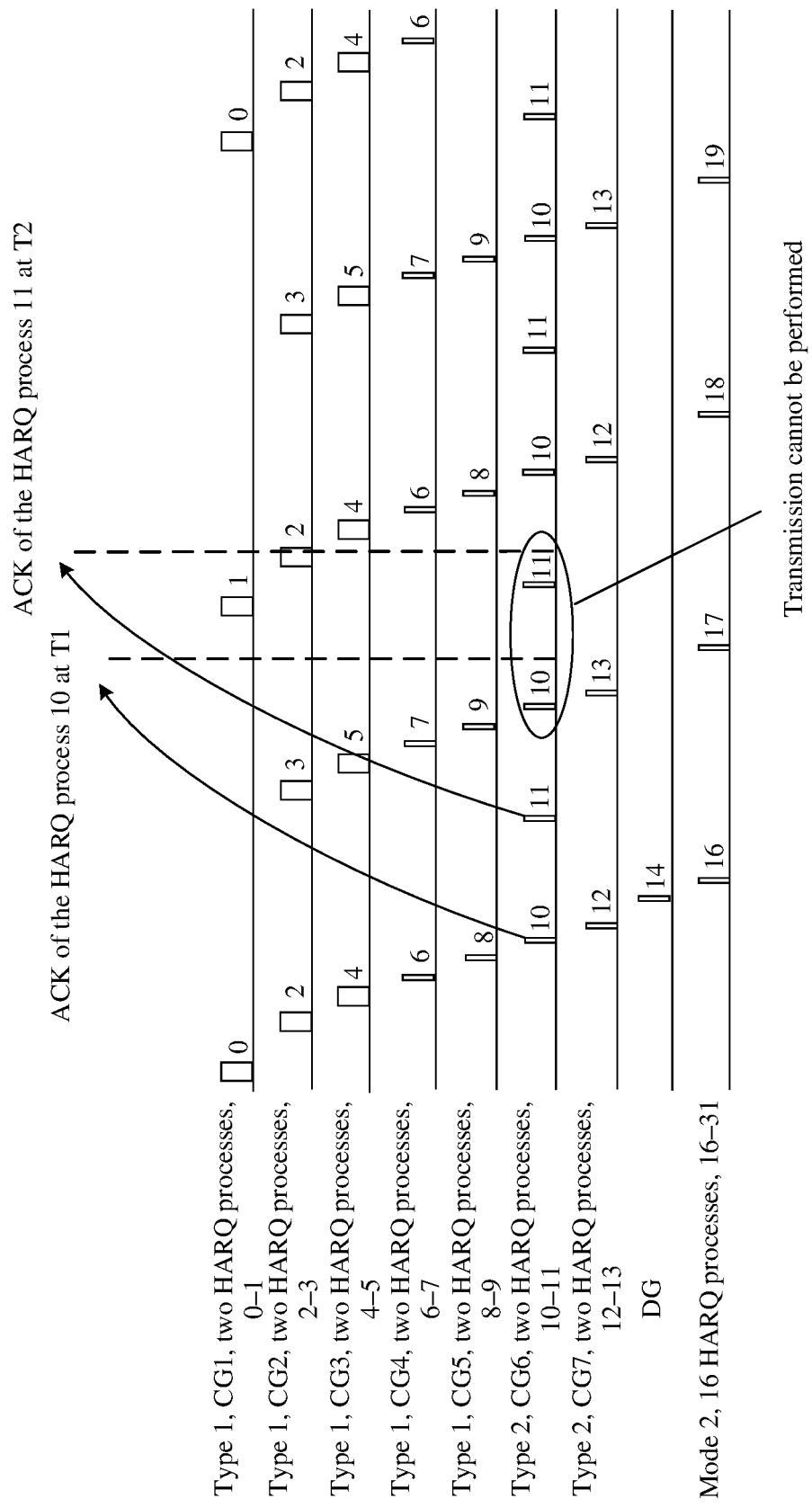
Figure 8:
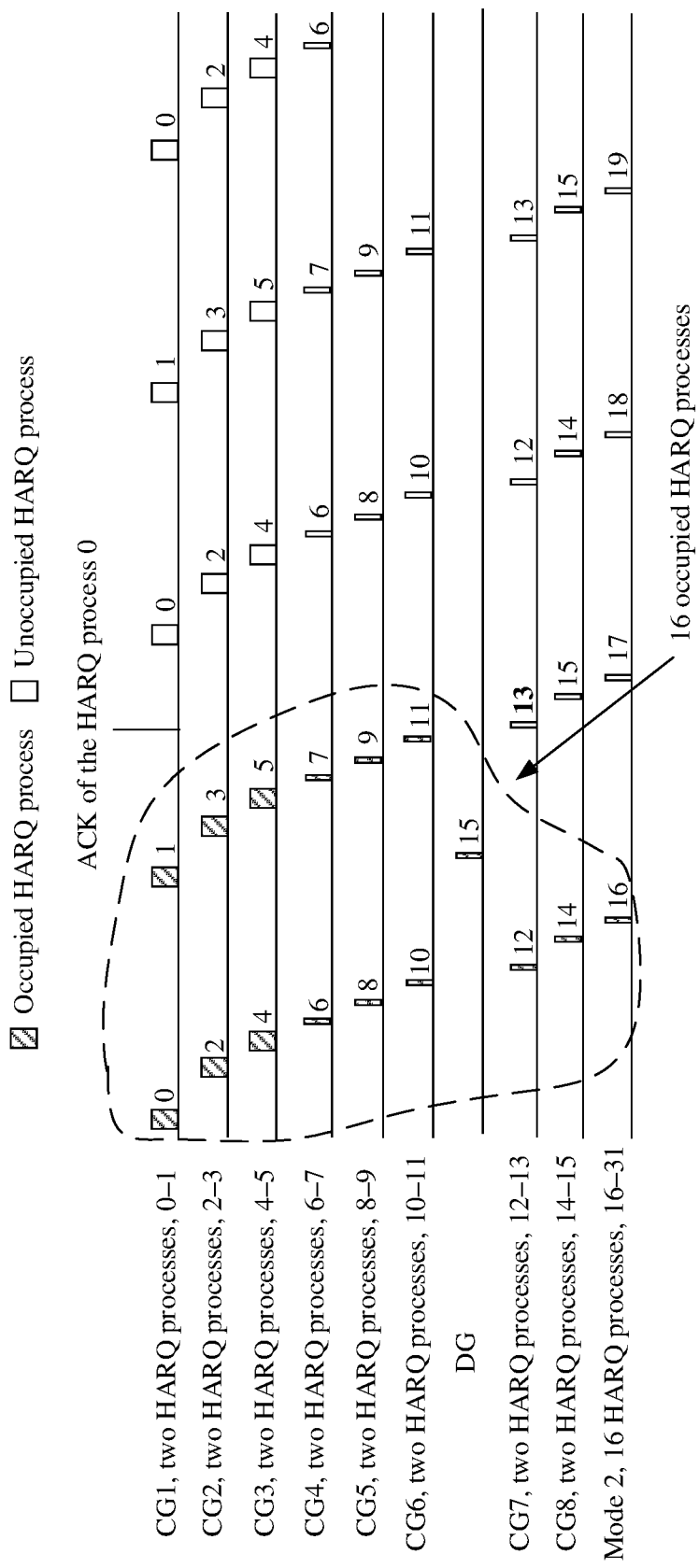

For example, refer to FIG. 7. The transmit terminal receives, at a moment T1, an ACK of data sent by the transmit terminal in the HARQ process 10. If an ACK of data sent in the HARQ process 11 is received at a moment T2, data cannot be transmitted on two sidelink grants (which are associated with the HARQ process 10 and the HARQ process 11) circled in the figure, causing a resource waste.

Problem 5: Resources are wasted.

It is assumed that the transmit terminal supports a maximum of 16 HARQ processes on one carrier. In one case, after the 16 HARQ processes are occupied, if the transmit terminal receives a HARQ feedback of data transmitted in a specific HARQ process, the transmit terminal may release the HARQ process, and transmit the data in a HARQ process associated with another HARQ process ID. For example, refer to FIG. 8. If the transmit terminal receives an ACK of the data transmitted in the HARQ process 0, the transmit terminal releases a HARQ process associated with the HARQ process 0, and starts the HARQ process 13. In this case, each HARQ process may be for data transmission. The transmit terminal and the receive terminal maintain one buffer (for example, a HARQ buffer or a soft buffer) for each HARQ process ID. In this case, buffer overheads are buffer overheads of 32 HARQ processes.

In another case, after 16 HARQ processes are occupied, if the transmit terminal receives a HARQ feedback of data transmitted in a specific HARQ process, the transmit terminal does not release the HARQ process, and can continue to transmit the data only in a HARQ process with a same ID as a previous HARQ process. In this case, the terminal transmits data only on HARQ processes associated with a maximum of 16 HARQ process IDs in the 32 HARQ process IDs. This means that sidelink grant associated with HARQ process IDs other than the 16 HARQ process IDs cannot be used, resulting in a resource waste.

Figure 9:
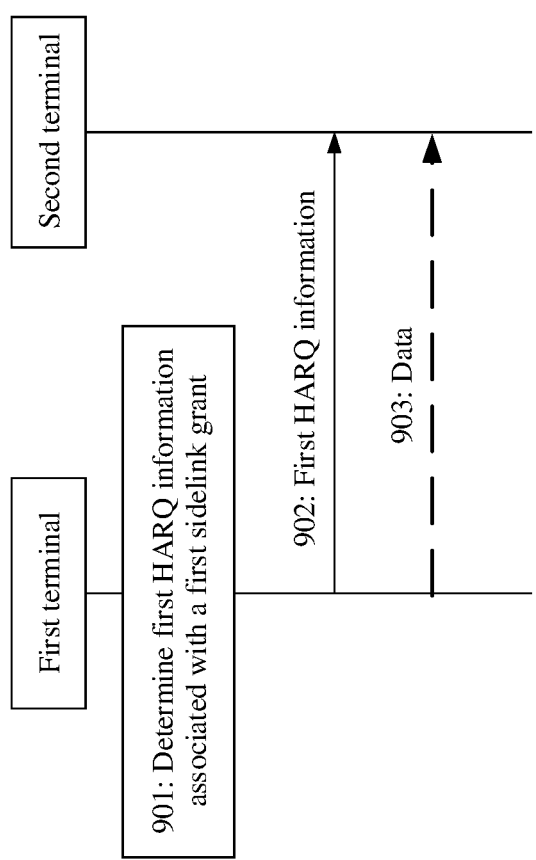
FIG. 9 and FIG. 10($a$) and FIG. 10($b$) both are a flowchart of a communication method according to an embodiment of this application.

To resolve the foregoing problems, an embodiment of this application provides a communication method. As shown in FIG. 9, the communication method includes the following steps.

901: A first terminal determines first HARQ information associated with a first sidelink grant.

For example, the first sidelink grant is for carrying data between the first terminal and a second terminal. The first terminal is a transmit terminal in the two terminals, and the second terminal is a receive terminal in the two terminals.

Optionally, the first sidelink grant is a sidelink grant in a SL transmission resource obtained by the first terminal.

Optionally, the first sidelink grant belongs to a second resource, and the second resource includes any one or more of the following types of resources (in this case, it may be considered that only a sidelink grant in the second resource allows the first terminal to determine associated HARQ information for the sidelink grant):

(1) a resource of the SL;
(2) a mode-1 resource of the SL;
(3) a CG resource of the SL;
(4) a type-1 CG resource of the SL;
(5) a type-2 CG resource of the SL;
(6) a DG resource of the SL;
(7) a mode-2 resource of the SL; and
(8) a CG resource set of the SL, where the CG resource set includes one or more CG resources corresponding to one or more CG resource indexes.

For example, the second resource may include the mode-2 resource of the SL, the second resource may include the type-1 CG resource of the SL and the mode-2 resource of the SL, or the second resource may include a specific CG resource set of the SL and the mode-2 resource of the SL.

For example, the type of the resource included in the second resource may be configured by a network device for the first terminal, may be determined by the first terminal, or may be preconfigured.

If the type of the resource included in the second resource is configured by the network device for the first terminal, the method may further include: The network device generates configuration information for configuring the type of the resource included in the second resource, and sends the configuration information to the first terminal. Correspondingly, the terminal receives the configuration information from the network device, and determines the second resource based on the configuration information. The second resource may be for data transmission between the first terminal and another terminal (for example, the second terminal).

Optionally, the network device may configure, for the first terminal based on each logical channel (LCH) or logical channel group (LCG), the type of the resource included in the second resource. In this case, one LCH or LCG may correspond to one second resource. When data on the LCH or LCG is transmitted by using a sidelink grant that belongs to the second resource, the first terminal determines associated HARQ information for the sidelink grant.

If the type of the resource included in the second resource is preconfigured, the type of the resource included in the second resource may be specified in a protocol, may be stored by a device vendor in the first terminal before delivery of the first terminal, or may be preconfigured in the first terminal by the network device when the first terminal is connected to a network.

Optionally, the first HARQ information includes any one or more of the following content, including (1) a first HARQ process ID associated with the first sidelink grant, (2) a new data indication (NDI) associated with the first sidelink grant, where the NDI indicates whether corresponding transmission is new transmission or retransmission, (3) an RV associated with the first sidelink grant, where the RV indicates an RV used by corresponding data, or (4) a modulation and coding scheme (MCS) associated with the first sidelink grant, where the MCS indicates an MCS for the corresponding data.

For the first HARQ process ID, the first terminal may autonomously determine the first HARQ process ID associated with the first sidelink grant. In this case, the first HARQ process ID may be the same as or different from a second HARQ process ID. The second HARQ process ID is a HARQ process ID determined by the first terminal for the first sidelink grant according to a preset algorithm, or a HARQ process ID indicated by the network device to the first sidelink grant. Alternatively, the first terminal may calculate, according to a preset algorithm, the first HARQ process ID associated with the first sidelink grant; or the network device indicates, to the first terminal, the first HARQ process ID associated with the first sidelink grant. In this case, the first HARQ process ID is the same as the second HARQ process ID. In this embodiment of this application, when the first terminal calculates, according to a preset algorithm, the HARQ process ID associated with the sidelink grant, the preset algorithm is an algorithm used when the network device calculates the HARQ process ID associated with the sidelink grant, for example, the foregoing preset algorithm 1 or preset algorithm 2.

The NDI may occupy one bit. For example, if the NDI is toggled, new transmission may be indicated, and if the NDI is not toggled, retransmission may be indicated. Alternatively, if the NDI is toggled, retransmission may be indicated, and if the NDI is not toggled, new transmission may be indicated. For example, if the NDI is 1, new transmission may be indicated, and if the NDI is 0, retransmission may be indicated. Alternatively, if the NDI is 1, retransmission may be indicated, and if the NDI is 0, new transmission may be indicated. The first terminal autonomously determines the NDI associated with the first sidelink grant. To be specific, the first terminal autonomously determines whether the first sidelink grant is for new transmission or retransmission.

The first terminal autonomously determines the RV associated with the first sidelink grant. To be specific, the first terminal autonomously determines the RV of the data sent on the first sidelink grant.

The first terminal autonomously determines the MCS associated with the first sidelink grant. To be specific, the first terminal autonomously determines the MCS for transmitting data on the first sidelink grant.

Optionally, before step 901, the method further includes: The first terminal determines that there is data to be sent on the first sidelink grant.

Optionally, when there is buffered data on the LCH or the LCG corresponding to the first sidelink grant, the first terminal determines that there is data to be sent on the first sidelink grant.

Optionally, when there is a to-be-transmitted MAC PDU in a buffer with a message 3 (MSG3), the first terminal determines that there is data to be sent on the first sidelink grant.

Optionally, when there is a to-be-transmitted MAC PDU in a multiplexing and assembly entity (Multiplexing and assembly entity), the first terminal determines that there is data to be transmitted on the first sidelink grant.

902: The first terminal sends the first HARQ information to the second terminal through the SL, where the SL is a wireless direct communication link between the first terminal and the second terminal.

For example, the first HARQ information may be carried in SCI or another message.

Optionally, after step 902, the method further includes the following step:

903: The first terminal sends data to the second terminal by using the first sidelink grant.

For example, the data may be scheduled by the foregoing SCI carrying the first HARQ information.

According to the method provided in this embodiment of this application, the first terminal may autonomously determine the HARQ process ID associated with the sidelink grant. In this case, the first terminal may determine, based on a requirement, the HARQ process ID associated with the sidelink grant, without being affected by the network device.

A solution of autonomously determining, by the first terminal, the HARQ process ID associated with the sidelink grant can resolve the foregoing problem 3. Specifically, the terminal may associate different HARQ process IDs with different sidelink grants. For example, for some services or data transmission on some LCHs, if the transmit terminal can transmit data only by using a type-2 CG resource within a period of communication time, and cannot transmit data by using a type-1 CG resource, the transmit terminal supports a maximum of N HARQ processes. Within this period of communication time, all of the N HARQ processes may be used for transmission on the type-2 CG resource. In this way, it is ensured that the terminal can support the N HARQ processes at any moment regardless of which type of resource is being used for transmission. This improves transmission efficiency of the terminal.

In addition, the solution can resolve the foregoing problem 4. Based on an example shown in FIG. 7, the transmit terminal can avoid the problem 4 by associating different HARQ process IDs with the sidelink grant that is associated with the HARQ process 10 circled in the figure, and the sidelink grant that is associated with the HARQ process 10 before the HARQ process 10 circled in the figure. This is also applied to the HARQ process 11.

In addition, the solution can resolve the foregoing problem 5. The transmit terminal and/or the receive terminal maintain one buffer for each of the N HARQ process IDs, but sidelink grants associated with a same HARQ process ID may belong to different SL transmission resources (for example, different CG resources). Therefore, a waste of buffer resources and transmission resources can be avoided.

Different manners of determining the HARQ process ID lead to other different solutions of this application. Therefore, the manner of determining the HARQ process ID in this application is further described in this application in the following Method 1 (the first terminal autonomously determines the HARQ process ID associated with the sidelink grant) and Method 2 (the first terminal calculates, according to a preset algorithm, the HARQ process ID associated with the sidelink grant, or the network device indicates, to the first terminal, the HARQ process ID associated with the sidelink grant). In addition, other technical solutions of this application in Method 1 and Method 2 are described in detail.

Method 1: The first terminal autonomously determines (or autonomously selects) the HARQ process ID associated with the sidelink grant.

That the first terminal autonomously determines the HARQ process ID associated with the sidelink grant means that the first terminal independently determines the HARQ process ID associated with the sidelink grant, without being affected by the network device. In other words, the first terminal and the network device determine, according to different rules or algorithms, the HARQ process ID associated with the sidelink grant.

The first sidelink grant is used as an example. Method 1 may be applied to the following Scenario 1 to Scenario 4.

Scenario 1: The first sidelink grant preempts a second sidelink grant.

Scenario 1 may specifically include the following Scenario 1.1 and Scenario 1.2.

Scenario 1.1: A second HARQ process ID associated with the first sidelink grant is the same as a seventh HARQ process ID associated with the second sidelink grant.

For example, the second HARQ process ID is a HARQ process ID that is associated with the first sidelink grant and that is calculated by the first terminal according to a preset algorithm, or a HARQ process ID that is associated with the first sidelink grant and that is indicated by the network device to the first terminal. The seventh HARQ process ID is a HARQ process ID that is associated with the second sidelink grant and that is calculated by the first terminal according to a preset algorithm, or a HARQ process ID that is associated with the second sidelink grant and that is indicated by the network device to the first terminal.

In Scenario 1.1, optionally, the first sidelink grant is a DG resource, and the second sidelink grant is a CG resource. When the HARQ process associated with the second sidelink grant is still occupied, if the first terminal receives information for configuring the first sidelink grant, and the second HARQ process ID associated with the first sidelink grant is the same as the seventh HARQ process ID associated with the second sidelink grant, it may be considered that the first sidelink grant preempts the second sidelink grant.

Scenario 1.2: The first sidelink grant and the second sidelink grant overlap (overlap) in time domain.

Overlap herein may be partial overlap or complete overlap.

In Scenario 1.2, optionally, the first sidelink grant is a DG resource, and the second sidelink grant is a CG resource. If the first terminal receives information for configuring the first sidelink grant, and the first sidelink grant and the second sidelink grant overlap in time domain, it may be considered that the first sidelink grant preempts the second sidelink grant.

In Scenario 1.1 and Scenario 1.2, optionally, the first terminal receives, on a PDCCH, the information for configuring the first sidelink grant, and DCI in the PDCCH is scrambled based on a radio network temporary identity (RNTI).

In Scenario 1, Method 1 may be specifically implemented in the following Manner 1 or Manner 2.

Manner 1: The first terminal determines an eighth HARQ process ID associated with the second sidelink grant as a first HARQ process ID. In other words, the eighth HARQ process ID is the same as the first HARQ process ID.

For example, the eighth HARQ process ID is a HARQ process ID that is associated with the second sidelink grant and that is autonomously determined by the first terminal.

It should be noted that, after determining the eighth HARQ process ID associated with the second sidelink grant, the first terminal stores a correspondence associated with the second sidelink grant. The correspondence is a correspondence between the second sidelink grant and the eighth HARQ process ID, a correspondence between the eighth HARQ process ID and the seventh HARQ process ID, or a correspondence among the second sidelink grant, the eighth HARQ process ID, and the seventh HARQ process ID. After the first terminal determines the first HARQ process ID in Manner 1, the first terminal may further perform the following step (11):

(11) The first terminal updates the correspondence associated with the second sidelink grant to a correspondence associated with the first sidelink grant.

For example, the correspondence between the second sidelink grant and the eighth HARQ process ID may be updated to a correspondence between the first sidelink grant and the first HARQ process ID, the correspondence between the eighth HARQ process ID and the seventh HARQ process ID may be updated to a correspondence between the first HARQ process ID and the second HARQ process ID, or the correspondence among the second sidelink grant, the eighth HARQ process ID, and the seventh HARQ process ID may be updated to a correspondence among the first sidelink grant, the first HARQ process ID, and the second HARQ process ID.

For example, an update in this embodiment of this application may be specifically modifying an original correspondence to a new correspondence, or deleting the original correspondence and then saving the new correspondence.

In addition, when the correspondence associated with the second sidelink grant further includes information about a resource to which the second sidelink grant belongs, the updated correspondence associated with the first sidelink grant may also include information about a resource to which the first sidelink grant belongs.

For example, a resource to which a sidelink grant in this embodiment of this application (for example, the second sidelink grant or the first sidelink grant) belongs is one of the following:

(1) a resource of the SL;
(2) a mode-1 resource of the SL;
(3) a CG resource of the SL;
(4) a type-1 CG resource of the SL;
(5) a type-2 CG resource of the SL;
(6) a DG resource of the SL;
(7) a mode-2 resource of the SL;
(8) a resource indicated by a CG resource index of the SL; and (9) a CG resource set of the SL, where the CG resource set includes one or more CG resources corresponding to one or more CG resource indexes.

For example, different sidelink grants may belong to different resources.

For example, if the second sidelink grant belongs to a CG1 resource, and the first sidelink grant belongs to a CG2 resource, the correspondence associated with the second sidelink grant may be: CG1+second sidelink grant↔eighth HARQ process ID, CG1+seventh HARQ process ID↔eighth HARQ process ID, or CG1+second sidelink grant+seventh HARQ process ID↔eighth HARQ process ID. The updated correspondence associated with the first sidelink grant may be: CG2+first sidelink grant↔first HARQ process ID, CG2+second HARQ process ID↔first HARQ process ID, or CG2+first sidelink grant+second HARQ process ID↔first HARQ process ID. In this embodiment of this application, "↔" indicates two parameters having a correspondence, where a parameter before "↔" and a parameter after "↔" have a correspondence.

Manner 2: The first terminal determines an identifier of an unoccupied HARQ process as a first HARQ process ID.

For example, the first terminal determines an identifier of an unoccupied HARQ process in N HARQ processes as the first HARQ process ID.

Optionally, if all of the N HARQ processes are occupied, the first terminal can no longer select a HARQ process ID for the first sidelink grant.

For example, the first terminal supports a maximum of N HARQ processes on one carrier, where N is an integer greater than 0.

For example, N may be 8, 16, or another value. For details, refer to a related rule in a related communication protocol. For example, it is assumed that the first terminal supports a maximum of 16 HARQ processes on one carrier. If HARQ processes associated with a HARQ process 0 to a HARQ process 2 and a HARQ process 6 to a HARQ process 15 are all occupied, the first terminal may select one of the HARQ process 3 to the HARQ process 5 as the first HARQ process ID.

For example, the first terminal may select a smallest or a largest ID value from HARQ process IDs corresponding to unoccupied HARQ processes as the first HARQ process ID. Certainly, selection may alternatively be performed according to some other rules. This is not limited in this application.

Optionally, the first HARQ process ID is an integer greater than or equal to 0 and less than N, where N is a maximum quantity of HARQ processes supported by the first terminal on one carrier. In this case, the foregoing problem 1 can be resolved. When N=16, only four bits are required in the SCI to indicate the HARQ process ID. When N=8, only three bits are required in the SCI to indicate the HARQ process ID. This reduces a quantity of bits occupied by the HARQ process ID in the SCI.

Optionally, in this embodiment of this application, that a HARQ process is occupied includes any one or more of the following cases:

(1) Data transmission associated with the HARQ process is not completed or does not end. For example, a scenario is as follows: When a HARQ feedback is not sent, a quantity of times for which the first terminal sends data to another terminal by using the HARQ process does not reach a quantity of blind retransmissions or repetitions (repetition).

(2) The first terminal receives no feedback of the HARQ process. For example, a scenario is as follows: The first terminal sends data to another terminal by using the HARQ process, and the first terminal is still waiting to receive a feedback from the another terminal, or the first terminal receives no feedback information after another terminal sends the feedback information.

(3) The first terminal receives a NACK of the HARQ process. For example, a scenario is as follows: The first terminal sends data to another terminal by using the HARQ process, and the first terminal receives a NACK from the another terminal.

(4) The first terminal receives no ACK of the HARQ process. For example, a scenario is as follows: The first terminal sends data to another terminal by using the HARQ process, and the first terminal receives no ACK from the another terminal, may receive a NACK from the another terminal, or may not receive any feedback information from the another terminal.

(5) The first terminal does not feed back an ACK of the HARQ process to the network device.

(6) Duration or a quantity of data transmissions associated with the HARQ process does not reach maximum transmission duration or a maximum quantity of transmissions.

(7) The first terminal does not release the HARQ process.

(8) The first terminal does not flush a HARQ buffer corresponding to the HARQ process.

(9) The first terminal stores or does not release a correspondence associated with the HARQ process.

For example, a correspondence associated with one HARQ process is: a correspondence between a sidelink grant associated with the HARQ process and a HARQ process ID that is autonomously determined by the first terminal and that is associated with the HARQ process, a correspondence between a HARQ process ID that is autonomously determined by the first terminal and that is associated with the HARQ process and a HARQ process ID that is determined by the first terminal according to a preset algorithm (or indicated by the network device to the first terminal) and that is associated with the HARQ process, or a correspondence among a sidelink grant associated with the HARQ process, a HARQ process ID that is autonomously determined by the first terminal and that is associated with the HARQ process, and a HARQ process ID that is determined by the first terminal according to a preset algorithm (or indicated by the network device to the first terminal) and that is associated with the HARQ process.

Optionally, in this embodiment of this application, that a HARQ process is not occupied includes any one or more of the following cases:

(1) Data transmission associated with the HARQ process is completed or ends. For example, a scenario is as follows: When a HARQ feedback is not sent, a quantity of times for which the first terminal sends data to another terminal by using the HARQ process reaches a quantity of blind retransmissions or repetitions.

(2) The first terminal receives no feedback of the HARQ process. For example, a scenario is as follows: When the first terminal performs groupcast communication with another terminal, and a HARQ feedback is NACK only (to be specific, after a transmit terminal sends data to one or more receive terminals, if a part of the one or more receive terminals has correctly received the data, the part of the one or more receive terminals does not send a feedback, or if a part of the one or more receive terminals fails to receive the data, the part of the one or more receive terminals feeds back a NACK to the transmit terminal), the first terminal sends the data to the another terminal by using the HARQ process. If the first terminal receives no feedback information when the another terminal sends feedback information, the first terminal considers that the another terminal has correctly received the data.

(3) The first terminal receives an ACK of the HARQ process. For example, a scenario is as follows: The first terminal sends data to another terminal by using the HARQ process, and when the first terminal receives an ACK from the another terminal, the first terminal considers that the another terminal has correctly received the data.

Optionally, the receiving, by the first terminal, an ACK of the HARQ process may be understood as that the first terminal receives only an ACK of the HARQ process. For example, when the first terminal performs groupcast communication with another terminal, and a HARQ feedback is an ACK/a NACK (after a transmit terminal sends data to one or more receive terminals, if a part of the one or more receive terminals has correctly received the data, the part of the one or more receive terminals feeds back an ACK to the transmit terminal, or if a part of the one or more receive terminals fails to receive the data, the part of the one or more receive terminals feeds back a NACK to the transmit terminal), the first terminal sends the data to the another terminal by using the HARQ process, and when the first terminal receives only an ACK from the another terminal, the first terminal considers that the another terminal has correctly received the data.

(4) The first terminal feeds back an ACK of the HARQ process to the network device. For example, a scenario is as follows: The first terminal sends data to another terminal by using the HARQ process, and the first terminal feeds back the ACK to the network device after determining that the data corresponding to the HARQ process is successfully transmitted (for example, the ACK from the another terminal is received, or no NACK from the another terminal is received).

(5) Duration or a quantity of data transmissions associated with the HARQ process reaches maximum transmission duration or a maximum quantity of transmissions.

(6) The first terminal releases the HARQ process.

(7) The first terminal flushes a HARQ buffer corresponding to the HARQ process.

(8) The first terminal does not store or release a correspondence associated with the HARQ process. After the first terminal determines the first HARQ process ID in Manner 2, the first terminal may further perform the following step (21):

(21) The first terminal stores a correspondence associated with the first sidelink grant (which is denoted as a first correspondence).

The first correspondence may be: a correspondence between the first sidelink grant and the first HARQ process ID, a correspondence between the first HARQ process ID and the second HARQ process ID, or a correspondence among the first sidelink grant, the first HARQ process ID, and the second HARQ process ID.

Optionally, the first correspondence stored by the first terminal may include information about a resource to which the first sidelink grant belongs.

For example, if the first sidelink grant belongs to a CG resource, the first correspondence may be: CG+first sidelink grant↔first HARQ process ID, CG+second HARQ process ID↔first HARQ process ID, or CG+first sidelink grant+ second HARQ process ID↔first HARQ process ID. For another example, if the first sidelink grant belongs to a CG1 resource, the first correspondence may be: CG1+first sidelink grant↔first HARQ process ID, CG1+second HARQ process ID↔first HARQ process ID, or CG1+first sidelink grant+second HARQ process ID↔first HARQ process ID.

It should be noted that, after determining a HARQ process ID associated with a sidelink grant (for example, the first sidelink grant), the terminal may directly store a correspondence associated with the sidelink grant, or store, after satisfying one or more of the following conditions, a correspondence associated with the sidelink grant.

(1) A HARQ feedback is enabled. For example, when the network device or the first terminal configures HARQ feedback to be enabled, the first terminal autonomously determines a HARQ process ID associated with a sidelink grant, and the first terminal communicates with another terminal by using the HARQ process ID. When the first terminal receives, from the another terminal, a NACK corresponding to the HARQ process ID, the first terminal may request a retransmission resource from the network device. In this case, the first terminal needs to know the HARQ process ID that can be identified by the network device and that corresponds to the HARQ process ID, so that the first terminal can request the retransmission resource by using the HARQ process ID that can be identified by the network device, therefore, a correspondence associated with the sidelink grant needs to be stored.

(2) The first terminal needs to request a retransmission resource from the network device. For example, the first terminal autonomously determines a HARQ process ID associated with a sidelink grant, and the first terminal communicates with another terminal by using the HARQ process ID. When the first terminal receives, from the another terminal, a NACK corresponding to the HARQ process ID, the first terminal may request a retransmission resource from the network device. In this case, the first terminal needs to know the HARQ process ID that can be identified by the network device and that corresponds to the HARQ process ID, so that the first terminal can request the retransmission resource by using the HARQ process ID that can be identified by the network device, therefore, a correspondence associated with the sidelink grant needs to be stored.

(3) The first terminal needs to feed back a transmission status on the SL to the network device. The first terminal autonomously determines a HARQ process ID associated with a sidelink grant, and the first terminal communicates with another terminal by using the HARQ process ID. When the first terminal receives a NACK that corresponds to the HARQ process ID and that comes from the another terminal, the first terminal may request a retransmission resource from the network device. In this case, the first terminal needs to know a HARQ process ID that can be identified by the network device and that corresponds to the HARQ process ID, so that the first terminal can use the HARQ process ID that can be identified by the network device, to notify the network device of a transmission failure in the HARQ process, and may request a retransmission resource from the network device. Alternatively, when the first terminal receives a NACK that corresponds to the HARQ process ID and that comes from another terminal, the first terminal may request a retransmission resource from the network device. In this case, the first terminal needs to know a HARQ process ID that can be identified by the network device and that corresponds to the HARQ process ID, so that the first terminal can use the HARQ process ID that can be identified by the network device, to notify the network device of a transmission success in the HARQ process, therefore, a correspondence associated with the sidelink grant needs to be stored.

Optionally, the first terminal may store respective correspondences for different sidelink grants, and the first terminal may store a maximum of N correspondences for N sidelink grants.

After the first terminal determines the first HARQ process ID in Manner 2, the first terminal may further delete the foregoing correspondence associated with the second sidelink grant, and release a storage resource in time. This improves utilization of the storage resource.

In Scenario 1, optionally, transmission corresponding to an NDI in first HARQ information is new transmission.

Scenario 2: The second HARQ process ID associated with the first sidelink grant is the same as an eleventh HARQ process ID associated with a sixth sidelink grant, and the HARQ process associated with the sixth sidelink grant is unoccupied.

For example, the eleventh HARQ process ID is a HARQ process ID that is associated with the sixth sidelink grant and that is calculated by the first terminal according to a preset algorithm, or a HARQ process ID that is associated with the sixth sidelink grant and that is indicated by the network device to the first terminal.

In Scenario 2, Method 1 may be specifically implemented in the foregoing Manner 1 or Manner 2. A method used after the first HARQ process ID is determined in Manner 1 or Manner 2 is similar to that in Scenario 1, provided that the second sidelink grant in the corresponding method is understood as the sixth sidelink grant. Details are not described again.

Scenario 3: Data transmitted on the first sidelink grant is retransmission of data transmitted on a fifth sidelink grant.

In Scenario 3, Method 1 specifically includes: The first terminal determines a ninth HARQ process ID associated with the fifth sidelink grant as the first HARQ process ID, that is, the ninth HARQ process ID is the same as the first HARQ process ID.

In this possible implementation, it can be ensured that a receive terminal places newly transmitted data and retransmitted data of same data in a same buffer for processing and that the receive terminal correctly decodes the data.

For example, the ninth HARQ process ID is a HARQ process ID that is associated with the fifth sidelink grant and that is autonomously determined by the first terminal.

For example, if the first terminal transmits data 1 to a second terminal on the fifth sidelink grant, the fifth sidelink grant is associated with the ninth HARQ process ID, and the first terminal retransmits the data 1 on the first sidelink grant (for example, because the first terminal receives a NACK of the data 1 from the second terminal, or the first terminal performs blind retransmission on the data 1), the first terminal determines the ninth HARQ process ID associated with the fifth sidelink grant as the first HARQ process ID.

In Scenario 3, it should be noted that, after determining the ninth HARQ process ID associated with the fifth sidelink grant, the first terminal may store a correspondence associated with the fifth sidelink grant. The correspondence may be: a correspondence between the fifth sidelink grant and the ninth HARQ process ID, a correspondence between the ninth HARQ process ID and a tenth HARQ process ID, or a correspondence among the fifth sidelink grant, the ninth HARQ process ID, and a tenth HARQ process ID. For example, the tenth HARQ process ID is a HARQ process ID that is associated with the fifth sidelink grant and that is calculated by the first terminal according to a preset algorithm, or by using a HARQ process ID that is associated with the fifth sidelink grant and that is indicated by the network device to the first terminal. After the first terminal determines the first HARQ process ID, the first terminal may further perform the following step (31):

(31) The first terminal updates the correspondence associated with the fifth sidelink grant to a correspondence associated with the first sidelink grant.

For example, the correspondence between the fifth sidelink grant and the ninth HARQ process ID may be updated to a correspondence between the first sidelink grant and the first HARQ process ID, the correspondence between the ninth HARQ process ID and the tenth HARQ process ID may be updated to a correspondence between the first HARQ process ID and the second HARQ process ID, or the correspondence among the fifth sidelink grant, the ninth HARQ process ID, and the tenth HARQ process ID may be updated to a correspondence among the first sidelink grant, the first HARQ process ID, and the second HARQ process ID.

In addition, when the correspondence associated with the fifth sidelink grant further includes information about a resource to which the fifth sidelink grant belongs, the updated correspondence associated with the first sidelink grant may also include information about a resource to which the first sidelink grant belongs. Details are similar to those described when the correspondence associated with the second sidelink grant is updated, and reference may be made to the foregoing for understanding. Details are not described again.

In Scenario 3, optionally, transmission corresponding to the NDI in the first HARQ information is retransmission.

Scenario 4 is a scenario other than Scenario 1, Scenario 2, and Scenario 3.

In Scenario 4, Method 1 may be specifically implemented in the foregoing Manner 2.

In Scenario 4, optionally, the first terminal stores the foregoing first correspondence. For a process of storing the foregoing first correspondence, refer to the foregoing description. Details are not described herein again.

Method 2: The first terminal calculates, according to a preset algorithm, a HARQ process ID associated with a sidelink grant, or the network device indicates, to the first terminal, the HARQ process ID associated with the sidelink grant.

A first sidelink grant is used as an example. Method 2 is applicable to the foregoing Scenario 1, Scenario 2, and Scenario 3.

In the foregoing Scenario 1, Scenario 2, and Scenario 3, during specific implementation of Method 2, the first terminal may calculate, according to a preset algorithm, the first HARQ process ID associated with the first sidelink grant, or the network device indicates, to the first terminal, a HARQ process ID associated with the first sidelink grant.

After the first terminal determines the first HARQ process ID by using Method 1 or Method 2, the following Event 1 (a HARQ process corresponding to the first HARQ process ID ends), Event 2 (data transmitted on the first sidelink grant needs to be retransmitted), or Event 3 (a fourth sidelink grant preempts the first sidelink grant) may occur. The following describes in detail solutions provided in this application in different events.

Event 1: The HARQ process corresponding to the first HARQ process ID ends.

Optionally, ending of the HARQ process corresponding to the first HARQ process ID includes any one or more of the following cases:

(1) The first terminal receives no feedback of the HARQ process corresponding to the first HARQ process ID. For example, a scenario is as follows: When the first terminal performs groupcast communication with another terminal, and a HARQ feedback is NACK only (to be specific, after a transmit terminal sends data to one or more receive terminals, if a part of the one or more receive terminals has correctly received the data, the part of the one or more receive terminals does not send a feedback, or if a part of the one or more receive terminals fails to receive the data, the part of the one or more receive terminals feeds back a NACK to the transmit terminal), the first terminal sends the data to the another terminal by using the HARQ process. If the first terminal receives no feedback information when the another terminal sends feedback information, the first terminal considers that the another terminal has correctly received the data.

(2) The first terminal receives an ACK of the HARQ process corresponding to the first HARQ process ID. For example, a scenario is as follows: The first terminal sends data to another terminal by using the HARQ process, and when the first terminal receives an ACK from the another terminal, the first terminal considers that the another terminal has correctly received the data.

(3) The first terminal receives only an ACK of the HARQ process corresponding to the first HARQ process ID. For example, a scenario is as follows: When the first terminal performs groupcast communication with another terminal, and a HARQ feedback is an ACK/a NACK (after a transmit terminal sends data to one or more receive terminals, if a part of the one or more receive terminals has correctly received the data, the part of the one or more receive terminals feeds back an ACK to the transmit terminal, or if a part of the one or more receive terminals fails to receive the data, the part of the one or more receive terminals feeds back a NACK to the transmit terminal), the first terminal sends the data to the another terminal by using the HARQ process, and when the first terminal receives only an ACK from the another terminal, the first terminal considers that the another terminal has correctly received the data.

(4) The first terminal sends, to the network device, an ACK of the HARQ process corresponding to the first HARQ process ID. For example, a scenario is as follows: The first terminal sends data to another terminal by using the HARQ process, and the first terminal feeds back the ACK to the network device after determining that transmission corresponding to the HARQ process succeeds (for example, the ACK from the another terminal is received, or no NACK from the another terminal is received).

(5) Duration for data transmission that is associated with the HARQ process corresponding to the first HARQ process ID reaches maximum transmission duration, for example, a timer expires.

(6) A quantity of data transmissions that are associated with the HARQ process corresponding to the first HARQ process ID reaches a maximum quantity of transmissions.

(7) The first terminal releases the HARQ process corresponding to the first HARQ process ID.

(8) The first terminal flushes a HARQ buffer of the HARQ process corresponding to the first HARQ process ID.

(9) Another sidelink grant preempts the first sidelink grant.

(10) Data transmission associated with the HARQ process is completed or ends. For example, a scenario is as follows: When a HARQ feedback is not sent, a quantity of times for which the first terminal sends data to another terminal by using the HARQ process reaches a quantity of blind retransmissions or repetitions.

In this embodiment of this application, a case in which a sidelink grant preempts another sidelink grant is similar to the foregoing case in which the first sidelink grant preempts the second sidelink grant. For details, refer to the foregoing related parts. Details are not described again.

In Event 1, optionally, the method further includes the following step:

(41) The first terminal deletes the foregoing first correspondence.

It should be noted that the first terminal may alternatively not delete the foregoing first correspondence. In this case, when the correspondence associated with the first HARQ process ID needs to be stored or updated subsequently, update is performed based on the first correspondence.

Event 2: Data transmitted on the first sidelink grant needs to be retransmitted.

In Event 2, optionally, the method further includes the following step (51) to step (53):

(51) The first terminal obtains a third sidelink grant for retransmitting the data.

In a case, before step (51), the method further includes the following step:

(50) The first terminal receives, from the second terminal, a NACK of the HARQ process associated with the first HARQ process ID. In other words, when determining that the data is not successfully transmitted, the first terminal obtains the third sidelink grant for retransmitting the data.

In another case, the first terminal retransmits (for example, performs blind retransmission or repetition on) the data transmitted on the first sidelink grant, and the first terminal obtains the third sidelink grant for retransmitting the data.

(52) The first terminal determines the first HARQ process ID as the HARQ process ID associated with the third sidelink grant.

(53) The first terminal sends second HARQ information to the second terminal, where the second HARQ information includes a first HARQ process ID associated with the third sidelink grant.

Optionally, the second HARQ information further includes one or more of NDI information, an RV, and an MCS. For example, the NDI information indicates that corresponding transmission is retransmission. Functions and determining methods of the RV and the MCS and those of the information in the first HARQ information are similar, and differ only in that the information herein is intended for the third sidelink grant. For details, refer to the foregoing description. Details are not described again.

It should be noted that the solution shown in step (51) to step (53) may be an independent solution. For details, refer to the part shown in the third aspect of the present invention. For related explanation of the part of content, refer to the explanation of step (51) to step (53). Details are not described again.

The solution shown in step (51) to step (53) can resolve the foregoing problem 2. Specifically, data transmitted on a sidelink grant in a CG resource may be retransmitted by using a sidelink grant in the CG resource. Data transmitted on a sidelink grant in a CG resource may alternatively be retransmitted by using a sidelink grant in another CG resource, so that a retransmission latency can be ensured. Different CG resources may share a HARQ process ID. In addition, data transmitted on a DG resource may also be retransmitted by using a sidelink grant in a CG resource.

Optionally, after step (53), the method further includes the following step (54):

(54) The first terminal retransmits the data to the second terminal by using the third sidelink grant.

Optionally, after step (52), if the first terminal determines the first HARQ process ID in the foregoing Method 1, the method further includes the following step:

(61) The first terminal updates the first correspondence to a correspondence associated with the third sidelink grant.

For example, when the first correspondence is a correspondence between the first sidelink grant and the first HARQ process ID, the first correspondence is updated to a correspondence between the third sidelink grant and the first HARQ process ID.

When the first correspondence is the correspondence between the first HARQ process ID and the second HARQ process ID, the first correspondence is updated to a correspondence between the first HARQ process ID and a fourth HARQ process ID.

When the first correspondence is the correspondence among the first sidelink grant, the first HARQ process ID, and the second HARQ process ID, the first correspondence is updated to a correspondence among the third sidelink grant, the first HARQ process ID, and the fourth HARQ process ID.

For example, the fourth HARQ process ID is a HARQ process ID determined by the first terminal for the third sidelink grant according to a preset algorithm, or a HARQ process ID indicated by the network device to the third sidelink grant.

Optionally, the second HARQ process ID associated with the first sidelink grant is the same as or different from the fourth HARQ process ID associated with the third sidelink grant.

In addition, when the first correspondence further includes information about a resource to which the first sidelink grant belongs, the updated correspondence associated with the third sidelink grant may also include information about a resource to which the third sidelink grant belongs. Details are similar to those described when the correspondence associated with the second sidelink grant is updated, and reference may be made to the foregoing for understanding. Details are not described again.

Optionally, after step (52), if the first terminal determines the first HARQ process ID in the foregoing Method 2, the method further includes the following step:

(71) The first terminal stores a correspondence associated with the third sidelink grant (which is denoted as a second correspondence).

The second correspondence is: a correspondence between the third sidelink grant and the first HARQ process ID, a correspondence between the first HARQ process ID and the fourth HARQ process ID, or a correspondence among the third sidelink grant, the first HARQ process ID, and the fourth HARQ process ID.

Optionally, the second correspondence stored by the first terminal includes information about a resource to which the third sidelink grant belongs. Details are similar to those described when the first correspondence is stored. For understanding, refer to the foregoing description. Details are not described again.

Optionally, during specific implementation, step (51) may be implemented in the following Manner (1), Manner (2), or Manner (3). Which manner is used may be configured by the network device for the first terminal, or may be determined by the first terminal.

Manner (1): The first terminal determines the third sidelink grant for retransmitting the data.

Optionally, Manner (1) specifically includes: The first terminal selects, from a first resource, the third sidelink grant for retransmitting the data.

For example, the first resource includes any one or more types of the following resources:
(1) a resource of the SL;
(2) a mode-1 resource of the SL;
(3) a CG resource of the SL;
(4) a type-1 CG resource of the SL;
(5) a type-2 CG resource of the SL;
(6) a DG resource of the SL;
(7) a mode-2 resource of the SL; and
(8) a CG resource set of the SL, where the CG resource set includes one or more CG resources corresponding to one or more CG resource indexes.

For example, the first resource may include the mode-2 resource of the SL, the first resource may include the type-2 CG resource of the SL and the mode-2 resource of the SL, or the first resource may include the CG resource set of the SL and the mode-2 resource of the SL.

For example, a type of a resource included in the first resource may be configured by a network device for the first terminal, or may be determined by the first terminal. If the type of the resource included in the first resource may be configured by the network device for the first terminal, the method further includes: The network device generates configuration information and sends the configuration information to the first terminal. The configuration information is for configuring the type of the resource included in the first resource. Correspondingly, the terminal receives the configuration information from the network device, determines, based on the configuration information, the type of the resource included in the first resource, determines the first resource based on a SL transmission resource previously configured by the network device for the first terminal, and determines, from the first resource, the third sidelink grant for retransmitting the data. For example, the network device previously configures the type-1 CG resource of the SL, the type-2 CG resource of the SL, and the DG resource of the SL for the first terminal, and the configuration information is that the type of the resource included in the first resource that is configured by the first terminal is the type-1 CG resource of the SL. In this case, the first terminal determines, from the type-1 CG resource of the SL configured by the network device for the first terminal, the third sidelink grant for retransmitting the data.

In a case, the network device may configure, for each LCH or LCG, the type of the resource included in the first resource. In this case, the first terminal may select, from the first resource, a retransmission resource for the first sidelink grant only when the data transmitted on the first sidelink grant is data of the LCH or the LCG. For example, some LCHs can be retransmitted by using only a type-1 CG. In this case, the type of the resource included in the first resource that is configured for the LCHs may be the type-1 CG. For another example, the type of the resource included in the first resource that is configured for the LCG may be a CG resource set (for example, a CG resource set 1).

In another case, the network device may alternatively configure, for a type of a resource included in each second resource, the type of the resource included in the first resource. For example, a type of a resource included in the second resource may be a CG resource set, and the type of the resource included in the first resource may also be a CG resource set. The two CG resource sets may be the same or different. The CG resource set may be configured for a specific service. For example, the second resource may be a type-2 CG resource, and the first resource may be a type-2 CG resource and a DG resource. For transmission of the sidelink grant on the type-2 CG resource, the first terminal may determine, from the type-2 CG resource and the DG resource, the third sidelink grant for retransmitting the data.

In another case, the network device may not configure, for any parameter, the type of the resource included in the first resource, but directly configure one or more resource types for the first terminal. A sidelink grant in a resource set indicated by the one or more resource types (for example, a CG resource set or a resource set including a plurality of types of resources) can share a HARQ process ID, or can be mutually used for retransmission. In this case, it may be considered that the first resource and the second resource are same resources, that is, both the first resource and the second resource are resource sets indicated by the one or several resource types.

In addition, some other conditions may also be configured for the first terminal. For example, because the type-1 CG resource is used in an emergency, it may be configured whether the DG resource and/or the type-2 CG resource can be retransmitted by using the type-1 CG resource. Whether the DG resource and/or the type-2 CG resource can be retransmitted by using the type-1 CG resource may be preconfigured, configured by a network device, or defined in a protocol. The configuration may be configured for each LCH, each LCG, or each second resource. For another example, it may be configured whether a mode-1 resource and a mode-2 resource can use the resource of each other as a retransmission resource. Whether the mode-1 resource and the mode-2 resource can use the resource of each other as the retransmission resource may be preconfigured, configured by the network device, or defined in a protocol. Alternatively, configuration may be specific for each LCH, each LCG, or each second resource.

Optionally, during specific implementation of Manner (1), when selecting the third sidelink grant, the first terminal may consider any one or more of the following factors.

(1) A size of a sidelink grant: For example, whether to consider using the sidelink grant as the third sidelink grant is determined depending on whether the sidelink grant can accommodate data transmitted on the first sidelink grant. If the sidelink grant can accommodate the data transmitted on the first sidelink grant, the sidelink grant can be used for retransmitting the data transmitted on the first sidelink grant. In this case, it may be considered that the sidelink grant is used as the third sidelink grant.

(2) Whether data is transmitted on the sidelink grant: For example, whether to consider using the sidelink grant as the third sidelink grant is determined depending on whether data is transmitted on the sidelink grant originally. If no data is transmitted on the sidelink grant originally, it may be considered that the sidelink grant is used as the third sidelink grant.

(3) A priority of data to be transmitted on a sidelink grant and a priority of data transmitted on the first sidelink grant: For example, whether to consider using the sidelink grant as the third sidelink grant is determined based on comparison between the priority of the data to be transmitted on the sidelink grant originally and the priority of the data transmitted on the first sidelink grant. If the priority of the data to be transmitted on the sidelink grant originally is lower than the priority of the data transmitted on the first sidelink grant, it may be considered that the sidelink grant is used as the third sidelink grant.

Optionally, a priority includes quality of service (QoS) information, a proSe per packet priority (PPPP) value, a priority of a logical channel in a MAC PDU, a priority of a logical channel with a highest priority in the MAC PDU, or the like.

For example, when priorities of logical channels are compared, comparison may be performed based on priorities of logical channels on which two pieces of data are located or priorities of logical channels with a highest priority on which the two pieces of data are located.

(4) A time interval between a sidelink grant and the first sidelink grant: For example, whether to consider using the sidelink grant as the third sidelink grant is determined based on the time interval between the sidelink grant and the first sidelink grant. If the time interval between the sidelink grant and the first sidelink grant is short (for example, less than a first threshold), it may be considered that the sidelink grant is used as the third sidelink grant.

For example, the first threshold may be preconfigured, configured by the network device for the first terminal, specified in a communication protocol, determined by the network device according to a specific rule and notified to the first terminal, or defined before delivery of the first terminal. This is not specifically limited in this application.

In addition, when the third sidelink grant is determined, a plurality of factors in the foregoing four factors may alternatively be comprehensively considered. For example, the first terminal may determine, as the third sidelink grant, a sidelink grant that has a shortest time interval with the first sidelink grant, has no data to be transmitted originally, and that can accommodate data transmitted on the first sidelink grant. For another example, the first terminal may determine, as the third sidelink grant, a sidelink grant that has a shortest time interval with the first sidelink grant, on which the priority of the data to be transmitted originally is lower than the priority of the data transmitted on the first sidelink grant, and that can accommodate data transmitted on the first sidelink grant.

Optionally, it should be noted that, if there is data to be transmitted on the third sidelink grant originally, retransmission of the data transmitted on the first sidelink grant preempts a resource of data to be newly transmitted on the third sidelink grant originally. The first terminal may request a retransmission resource for the data to be newly transmitted on the third sidelink grant, or may continue to use the newly transmitted data as a volume of newly transmitted data to be transmitted. In this case, when the terminal requests a resource from the network device, a reported buffer status report (BSR) includes a size of the newly transmitted data to be transmitted.

Optionally, to ensure that both a high-priority service and a low-priority service can be transmitted, a proportion threshold or a threshold of a quantity of times of retransmitting the CG resource or the CG resource set may be set for a CG resource or a CG resource set. Within a period of time, if the proportion threshold or the threshold of the quantity of times is exceeded, the CG resource or the CG resource set cannot be for retransmission, so that retransmission of a high-priority service does not always perform preemption for new transmission of a low-priority service.

For example, the proportion threshold or the threshold of the quantity of times may be preconfigured, configured by the network device for the first terminal, specified in a communication protocol, determined by the network device according to a specific rule and notified to the first terminal, or defined before delivery of the first terminal. This is not specifically limited in this application.

Manner (2): The first terminal requests the third sidelink grant from the network device.

During specific implementation, Manner (2) may include the following step (81) and step (82):

(81) The first terminal sends a request message to the network device, where the request message is for requesting a retransmission resource from the network device, the retransmitting resource is for retransmitting the data transmitted on the first sidelink grant, and the request message includes the second HARQ process ID and/or the information about the resource to which the first sidelink grant belongs, or a resource for transmitting the request message is associated with the second HARQ process ID and/or the resource to which the first sidelink grant belongs. Correspondingly, the network device receives the request message from the first terminal.

For example, the first terminal may determine, based on the correspondence associated with the first sidelink grant, the second HARQ process ID associated with the first sidelink grant and/or the information about the resource to which the first sidelink grant belongs.

(82) The network device sends a request response to the first terminal based on the request message, where the request response includes information about the third sidelink grant for retransmitting the data transmitted on the first sidelink grant. Correspondingly, the first terminal receives the request response from the network device, and determines the third sidelink grant based on the request response.

Manner (3): The network device autonomously configures, for the first terminal, the third sidelink grant for retransmitting the data.

Optionally, Manner (3) may specifically include: The network device starts a first timer associated with the second HARQ process ID of the first terminal or the first sidelink grant, and when the first timer expires, if the network device receives no ACK of the sidelink data transmitted in the first HARQ process, the network device sends resource indication information to the first terminal, where the resource indication information indicates a SL transmission resource (for example, the third sidelink grant) for retransmitting data that fails to be transmitted on the first sidelink grant.

In Manner (3), the network device may maintain one timer for the first terminal, each HARQ process of the first terminal, each HARQ process ID of the first terminal, each sidelink grant of the first terminal, or each sidelink grant in a bundle of the first terminal. When the network device receives a transmission feedback (for example, an ACK or a NACK) corresponding to the timer, the network device restarts or starts the timer. If the timer expires, and the network device has not received a transmission feedback (for example, an ACK) that corresponds to the timer and that is sent by the first terminal, the network device sends a retransmission resource to the first terminal, and restarts the timer.

Optionally, duration of the timer depends on a time interval from sending the data by the transmit terminal to receiving the data by the receive terminal, time for sending a feedback to the transmit terminal by the receive terminal, and time for sending a feedback to the network device by the transmit terminal. For example, the timer is greater than or equal to "time interval from sending the data by the transmit terminal to receiving the data by the receive terminal+time for sending the feedback to the transmit terminal by the receive terminal+time for sending the feedback to the network device by the transmit terminal".

Manner (3) may be implemented as an independent solution. For details, refer to the part in the fourth aspect of the present invention. For related description of the part, refer to Manner (3) herein. Details are not described again.

For one piece of data, if a plurality of retransmissions occur, manners of obtaining sidelink grants used for the plurality of retransmissions may be the same (for example, all of the sidelink grants may be obtained in the foregoing Manner (1), Manner (2), or Manner (3)), or may be different (for example, a part of the sidelink grants is obtained in the foregoing Manner (1), and another part of sidelink grant is obtained in the foregoing Manner (2)). This is not limited in this application.

Event 3: The fourth sidelink grant preempts the first sidelink grant.

In Event 3, the method may further include:

(91) The first terminal determines third HARQ information associated with the fourth sidelink grant, where the third HARQ information includes a fifth HARQ process ID associated with the fourth sidelink grant.

During specific implementation of step (91), in a first possible implementation, the first terminal may determine the first HARQ process ID as the fifth HARQ process ID associated with the fourth sidelink grant.

In a first possible implementation, the method may further include: The first terminal updates the correspondence associated with the first sidelink grant to a correspondence between the fourth sidelink grant and the fifth HARQ process ID, a correspondence between the fifth HARQ process ID and a sixth HARQ process ID, or a correspondence among the fourth sidelink grant, the fifth HARQ process ID, and a sixth HARQ process ID.

For example, the sixth HARQ process ID is a HARQ process ID determined by the first terminal for the fourth sidelink grant according to a preset algorithm, or a HARQ process ID indicated by the network device to the fourth sidelink grant.

In a first possible implementation, optionally, the updated correspondence may also include information about a resource to which the fourth sidelink grant belongs. For details, refer to the foregoing description for understanding. Details are not described again.

In a second possible implementation, the first terminal may determine, in a manner similar to the foregoing Manner 2, the fifth HARQ process ID associated with the fourth sidelink grant.

In the second possible implementation, the method further includes: The first terminal stores a correspondence associated with the fourth sidelink grant (which is denoted as a third correspondence). The third correspondence is a correspondence between the fourth sidelink grant and the fifth HARQ process ID, a correspondence between the fifth HARQ process ID and the sixth HARQ process ID, or a correspondence among the fourth sidelink grant, the fifth HARQ process ID, and the sixth HARQ process ID.

In the second possible implementation, optionally, the stored correspondence may also include information about a resource to which the fourth sidelink grant belongs. For details, refer to the foregoing description for understanding. Details are not described again.

In the second possible implementation, optionally, the first terminal deletes the correspondence associated with the first sidelink grant (for example, the foregoing first correspondence).

In a third possible implementation, the first terminal may determine, according to a preset algorithm, the fifth HARQ process ID associated with the fourth sidelink grant, or the network device indicates, to the first terminal, the fifth HARQ process ID associated with the fourth sidelink grant.

During specific implementation of step (91), a process of determining the third HARQ information associated with the fourth sidelink grant is similar to a process of determining, in a scenario in which the first sidelink grant preempts the second sidelink grant, the first HARQ information associated with the first sidelink grant. Refer to the foregoing content for understanding. Details are not described again.

In the foregoing embodiments of this application, it should be noted that when a correspondence associated with a sidelink grant is stored, the correspondence may include a HARQ process ID that is associated with the sidelink grant and that is autonomously determined by the first terminal, or HARQ information that is associated with the sidelink grant and that is autonomously determined by the first terminal. The method provided in this embodiment of this application is described in the foregoing by using an example of a HARQ process ID that is associated with the sidelink grant, autonomously determined by the first terminal, and that is included in the correspondence. However, it may be understood that the HARQ process ID that is associated with the sidelink grant, autonomously determined by the first terminal, and that is included in the correspondence may alternatively be replaced by HARQ information that is associated with the sidelink grant and that is autonomously determined by the first terminal. For example, the first HARQ process ID in the foregoing first correspondence may alternatively be replaced by the first HARQ information. Similarly, a HARQ process ID determined by the first terminal for the sidelink grant according to a preset algorithm or a HARQ process ID indicated by the network device to the sidelink grant may be replaced by HARQ information determined by the first terminal for the sidelink grant according to the preset algorithm or HARQ information indicated by the network device to the sidelink grant. For example, the second HARQ process ID in the first correspondence may alternatively be replaced by HARQ information determined by the first terminal for the first sidelink grant according to the preset algorithm, or HARQ information indicated by the network device to the first sidelink grant. In addition, HARQ information associated with each sidelink grant may include one or more of a HARQ process ID, an NDI, an RV, and an MCS.

Optionally, in the foregoing embodiments of this application, a MAC entity, a HARQ entity, or a HARQ process of the first terminal may maintain (for example, store, update, or delete) the foregoing correspondence.

Optionally, in the foregoing embodiments of this application, the determining, by a first terminal, first HARQ information associated with a first sidelink grant may be performed by the MAC entity, the HARQ entity, or the HARQ process of the first terminal.

The following uses a specific example to describe the method provided in the foregoing embodiments. In this example, N=16. As shown in FIG. 10(*a*) and FIG. 10(*b*), the process includes the following steps.

Figure 11:
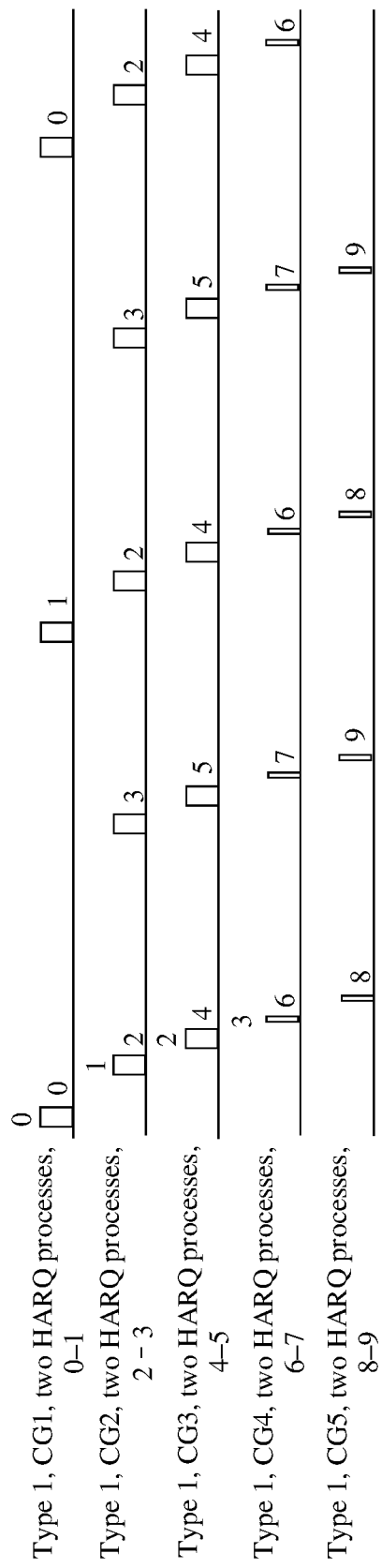
FIG. 11 is a schematic diagram of sidelink grants and corresponding HARQ process IDs of the sidelink grants according to an embodiment of this application.

1001: Refer to FIG. 11. A first terminal determines to send data on the 1$^{st}$ sidelink grant in a type-1 CG5 resource.

A small box in FIG. 11 represents a sidelink grant, a number on the right of the small box is a HARQ process ID (pre) corresponding to the sidelink grant, and a number above the box is a HARQ process ID (final) corresponding to the sidelink grant. "HARQ process ID (pre) indicates a HARQ process ID determined by the first terminal according to a preset algorithm, and "HARQ process ID (final)" indicates a HARQ process ID autonomously determined by the terminal.

Figures 12A, 12B:
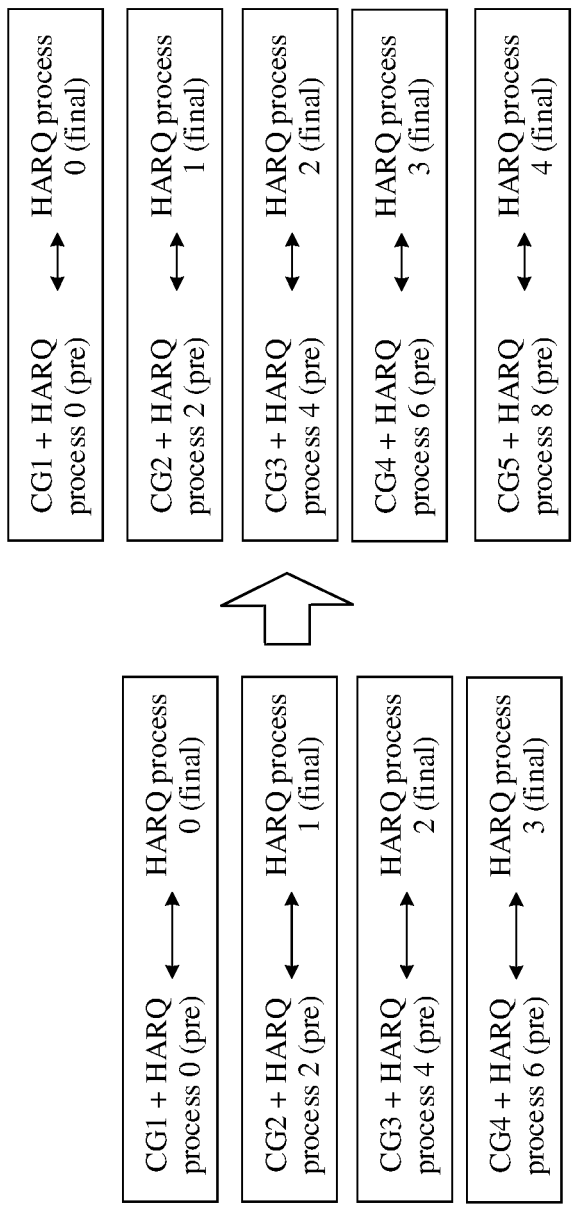
FIG. 12($a$) and FIG. 12($b$) are schematic diagrams of correspondences stored in a first terminal according to an embodiment of this application.

In this case, for a correspondence stored in the first terminal, refer to FIG. 12(*a*).

1002: The first terminal determines whether a quantity of HARQ processes that are being currently occupied is less than 16.

If the quantity of currently occupied HARQ processes is less than 16, step 1003 is performed. If the quantity of currently occupied HARQ processes is not less than 16, the process ends.

For example, in a scenario shown in FIG. 11, the quantity of HARQ processes that are currently being occupied is 4, that is, HARQ processes associated with a HARQ process 0, a HARQ process 1, a HARQ process 2, and a HARQ process 3 are occupied.

1003: The first terminal selects, as a HARQ process ID associated with the $1^{st}$ sidelink grant from unoccupied HARQ processes in the 16 HARQ processes, a HARQ process ID corresponding to one HARQ process.

Based on the example shown in FIG. 11, for example, the first terminal may select the HARQ process 4 from the HARQ process 4 to a HARQ process 15 as the HARQ process ID associated with the $1^{st}$ sidelink grant.

1004: The first terminal stores a correspondence between a HARQ process ID (pre) and a HARQ process ID (final) that are associated with the $1^{st}$ sidelink grant.

After step 1004, for the correspondence stored in the first terminal, refer to FIG. 12(*b*).

1005: The first terminal sends, to a second terminal, HARQ information associated with the $1^{st}$ sidelink grant, where the HARQ information includes the HARQ process ID (final), and sends data to the second terminal on the $1^{st}$ sidelink grant.

1006: The first terminal receives a HARQ feedback of the HARQ process ID (final) associated with the $1^{st}$ sidelink grant.

Figure 13:
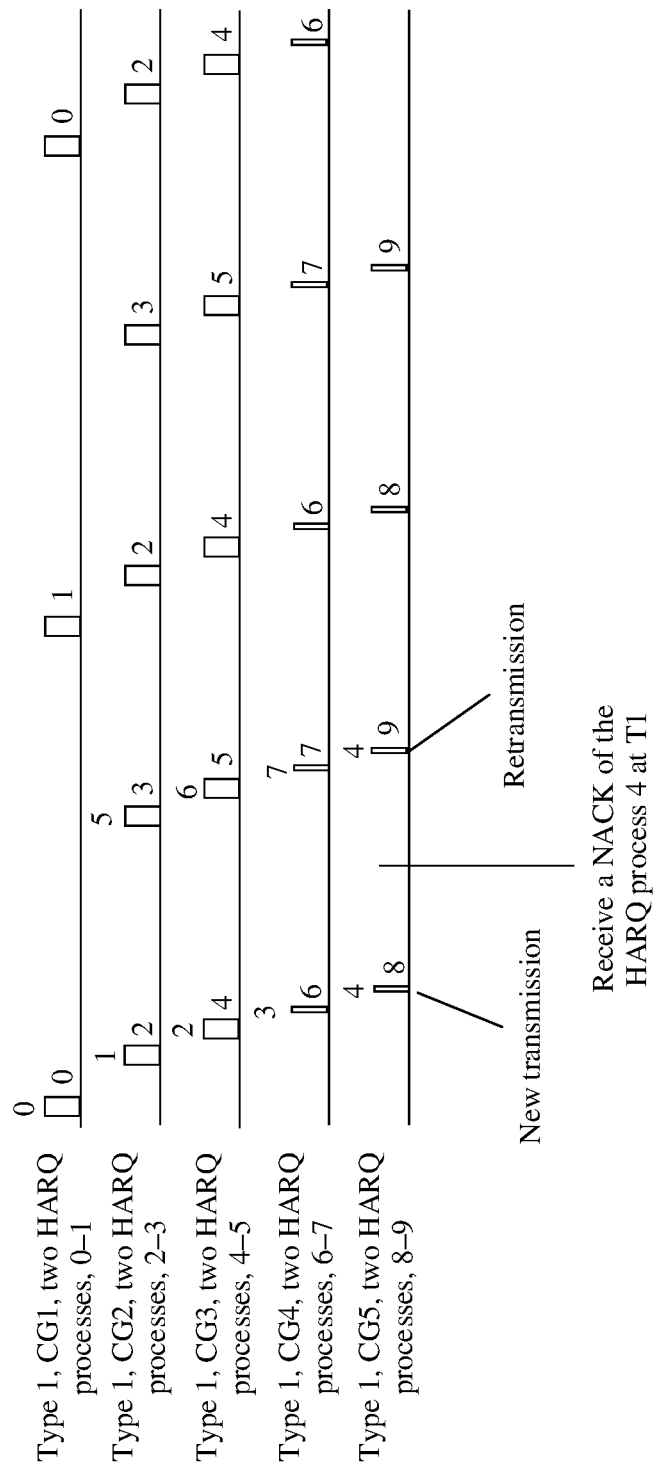
FIG. 13 is a schematic diagram of sidelink grants and corresponding HARQ process IDs of the sidelink grants according to an embodiment of this application.

If the HARQ feedback is an ACK, step 1007 is performed. If the HARQ feedback is a NACK (for example, based on the example shown in FIG. 11, a NACK is received at T1 as shown in FIG. 13), step 1008 is performed.

1007: The first terminal deletes the correspondence between the HARQ process ID (pre) and the HARQ process ID (final) that are associated with the $1^{st}$ sidelink grant.

Figure 14:
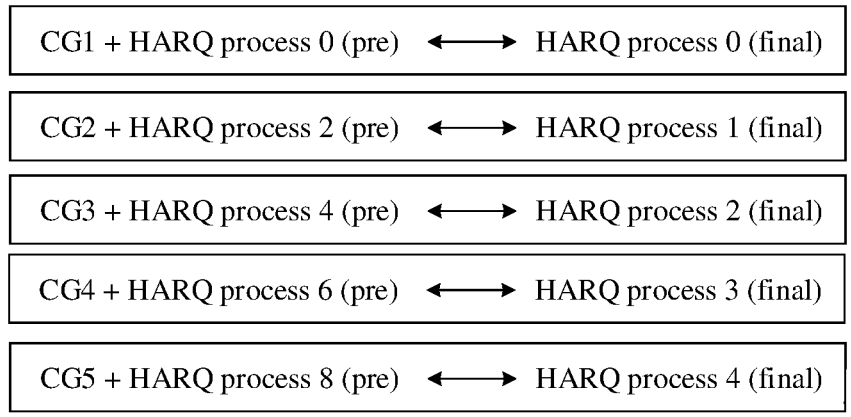
FIG. 14 and FIG. 15 both are a schematic diagram of correspondences stored in a first terminal according to an embodiment of this application.

For example, based on the example shown in FIG. 12(*a*) and FIG. 12(*b*), for deleting of the correspondence, refer to FIG. 14.

1008: The first terminal obtains a resource (which is denoted as a retransmission sidelink grant) for retransmitting the data.

For example, refer to FIG. 13. The first terminal may determine that the $2^{nd}$ sidelink grant in a type-1 CG5 resource is a retransmission sidelink grant.

1009: The first terminal determines a HARQ process ID associated with the retransmission sidelink grant as the HARQ process ID (final) associated with the $1^{st}$ sidelink grant.

For example, based on the example shown in FIG. 13, the HARQ process ID (final) associated with the retransmission sidelink grant is the HARQ process 4 (final).

1010: The first terminal updates the correspondence between the HARQ process ID (pre) and the HARQ process ID (final) that are associated with the $1^{st}$ sidelink grant to a correspondence between a HARQ process ID (pre) and a HARQ process ID (final) that are associated with the retransmission sidelink grant.

Figure 15:
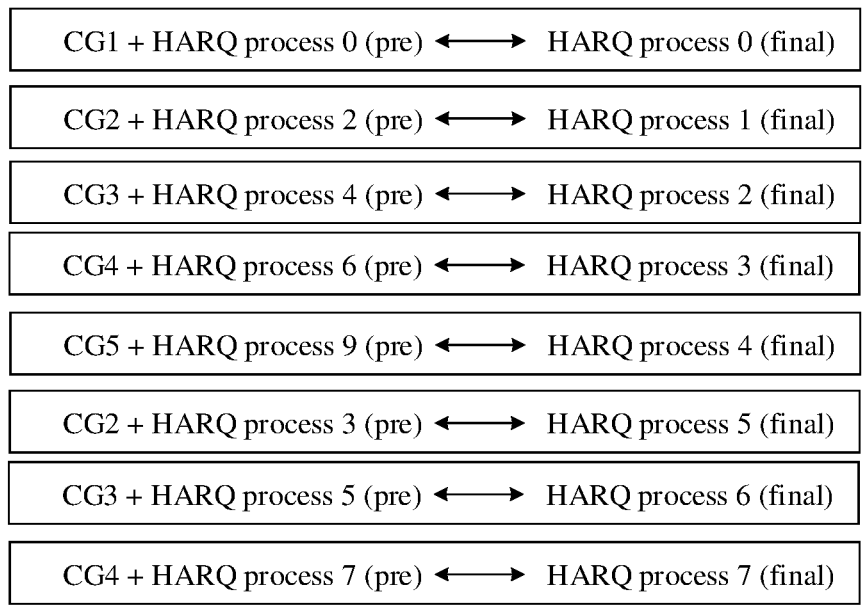

For example, based on the example shown in FIG. 13, for the updated correspondence, refer to FIG. 15.

Figure 10A:
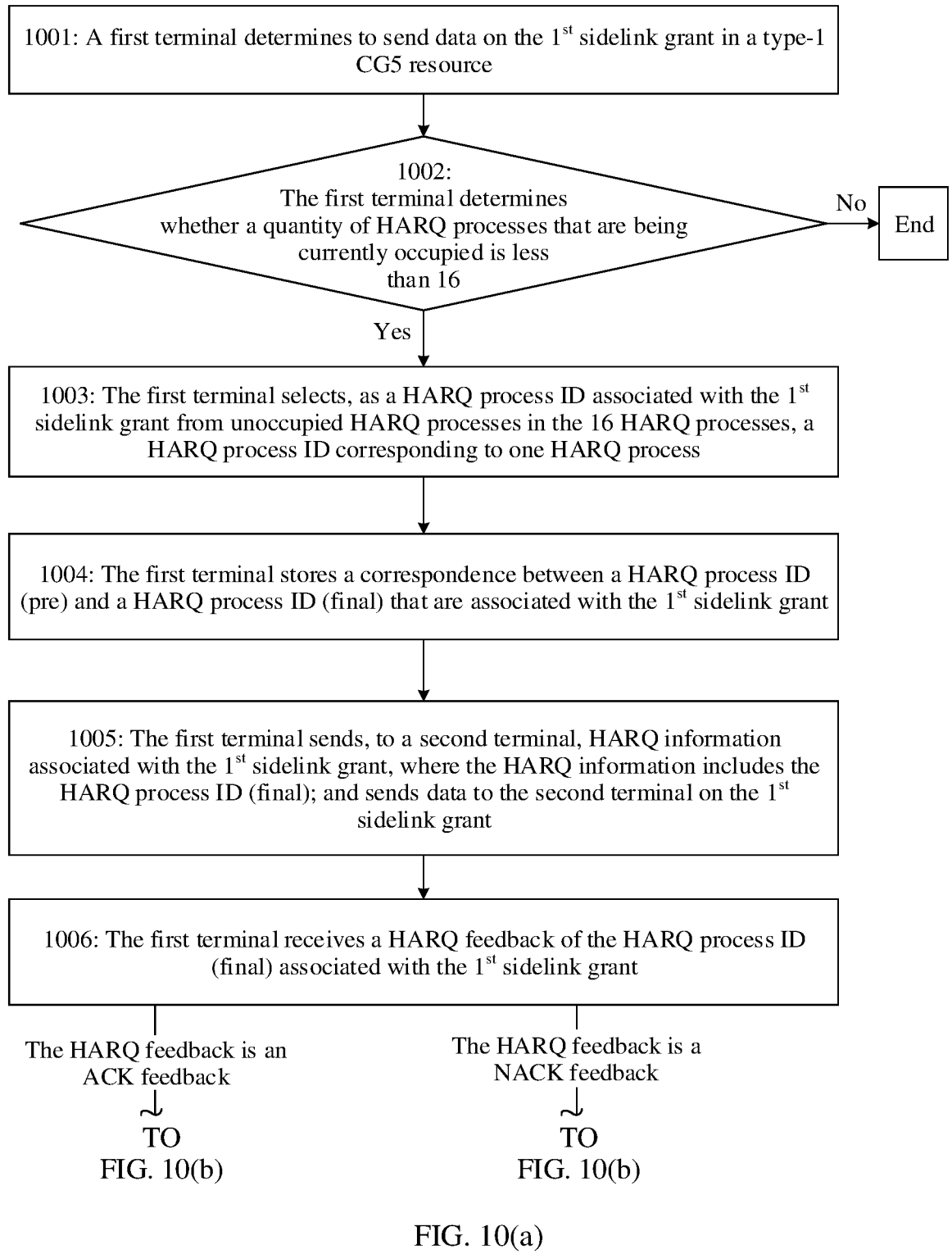
FIG. 10C shows a process of a communication method according to an embodiment of this application.
FIG. 10D is a schematic diagram of data transmission between a transmit terminal and a receive terminal according to an embodiment of this application.
Figure 10B:
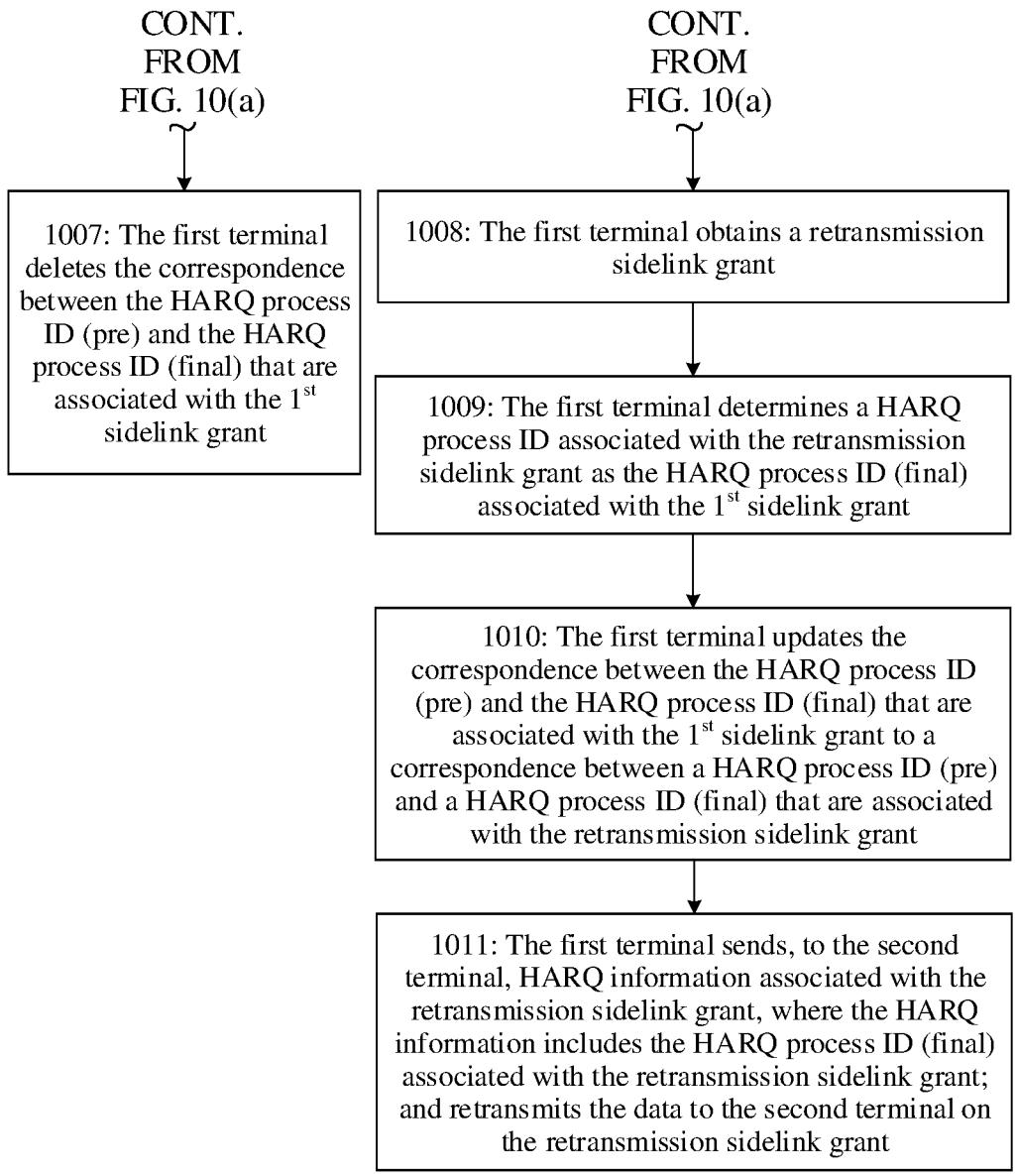
Figure 10C:
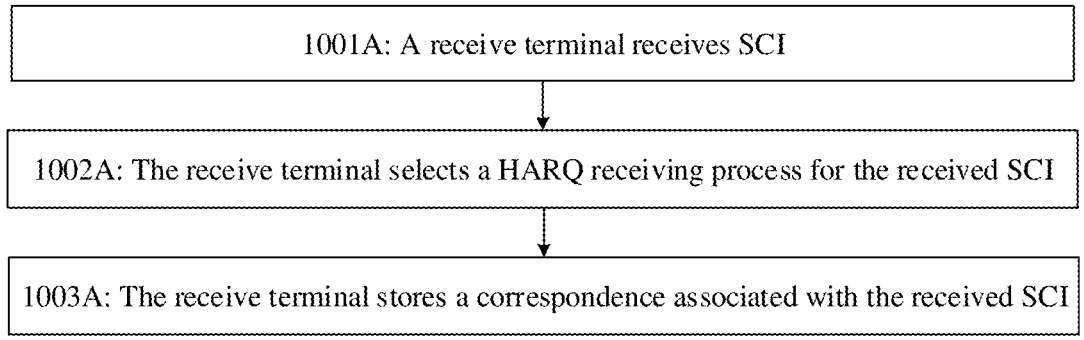
Figure 10D:
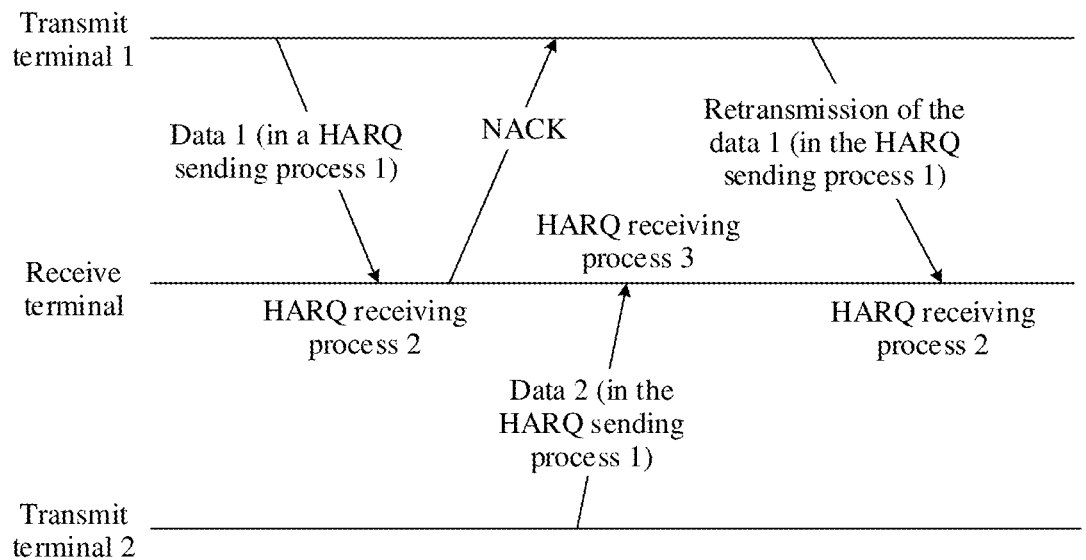

1011: The first terminal sends, to the second terminal, HARQ information associated with the retransmission sidelink grant, where the HARQ information includes the HARQ process ID (final) associated with the retransmission sidelink grant, and retransmits the data to the second terminal on the retransmission sidelink grant. In addition, one receive terminal may communicate with a plurality of different transmit terminals. Data sent by a transmit terminal is scheduled based on SCI. The transmit terminal notifies, by using a HARQ process ID carried in the SCI, the receive terminal of the HARQ process ID used when the data is sent. Different transmit terminals may use a same HARQ process ID to communicate with the receive terminal. In this case, HARQ process IDs in SCI that are sent by the different transmit terminals are the same. The receive terminal considers that data transmitted by using same HARQ process IDs corresponds to same data (for example, new transmission and retransmission of the same data). Therefore, data sent by different transmit terminals by using the same HARQ process ID may be placed into a same HARQ buffer or soft buffer for soft combination and decoding. Consequently, a decoding error may be caused. To resolve this problem, an embodiment of this application further provides a communication method. Refer to FIG. 10C. The communication method includes the following steps.

1001A: A receive terminal receives SCI.

For example, the receive terminal may receive the SCI from a transmit terminal.

For example, the SCI includes one or more of a HARQ process ID, an NDI, an RV, a source identifier (for example, a layer-1 source identifier (Layer-1 source ID)), a destination identifier (for example, a layer-1 destination identifier (Layer-1 destination ID)).

For example, the source identifier may be for identifying a transmit terminal in unicast, groupcast, or broadcast communication. The destination identifier may be for identifying a receive terminal in unicast, groupcast, or broadcast communication.

For example, a source identifier and a destination identifier may be for identifying unicast communication (in this case, the source identifier may be an identifier of a transmit terminal, and the destination identifier may be an identifier of a receive terminal) or groupcast communication (in this case, the source identifier may be an identifier of a transmit terminal, the destination identifier may be a group identifier, and the receive terminal is all terminals in a group).

For example, broadcast communication may be identified based on one destination identifier. In this case, the destination identifier may be an identifier of a broadcast service, and the receive terminal is all terminals that receive data of the broadcast services.

1002A: The receive terminal selects a HARQ receiving process for the received SCI.

For SCI sent by each transmit terminal, the receive terminal may select a HARQ process to receive data scheduled based on the SCI (for example, newly transmitted and retransmitted data scheduled based on the SCI are placed into a HARQ buffer or a soft buffer corresponding to the HARQ process for soft combination and decoding). For differentiation, a HARQ process used when the transmit terminal sends data may be referred to as a HARQ sending process. Correspondingly, an identifier of the HARQ sending process may be referred to as a HARQ sending process ID. A HARQ process used when the receive terminal receives data may be referred to as a HARQ receiving process. Correspondingly, an identifier of the HARQ receiving process may be referred to as a HARQ receiving process ID.

Optionally, when one piece of newly transmitted data is scheduled based on one piece of SCI, the receive terminal may select one HARQ process from unoccupied HARQ processes to receive the data scheduled based on the SCI.

For example, that the receive terminal does not occupy a HARQ process may include any one or more of the following cases:

(1) Transmission of data corresponding to the HARQ process is not completed or does not end.

(2) The data corresponding to the HARQ process fails to be decoded.

(3) The receive terminal has not fed back an ACK corresponding to the HARQ process to the transmit terminal.

(4) The receive terminal has fed back a NACK corresponding to the process to the transmit terminal.

(5) The receive terminal has not fed back a feedback corresponding to the HARQ process to the transmit terminal. For example, when the receive terminal sends the feedback to the transmit terminal, the receive terminal fails to feed back the feedback to the transmit terminal due to a conflict with another transmission.

(6) A quantity of times for which the receive terminal receives the data associated with the HARQ process does not reach a maximum quantity of transmissions. For example, a quantity of times for which the receive terminal receives one TB does not reach the maximum quantity of transmissions.

(7) The receive terminal receives no indication indicating a last data transmission.

(8) Duration for transmission in the HARQ process does not reach maximum transmission duration. For example, a timer corresponding to the HARQ process does not expire.

1003A: The receive terminal stores a correspondence associated with the received SCI.

It should be noted that, because data sent by different transmit terminals is generally different, after a transmit terminal sends a piece of newly transmitted data, if the receive terminal receives SCI for scheduling retransmitted data of the data, the retransmitted data needs to be processed by using a HARQ process that is associated with the newly transmitted data corresponding to the retransmitted data. To ensure that the receive terminal places newly transmitted data and retransmitted data that are sent by a same terminal into a same HARQ buffer or soft buffer for soft combination and decoding, the receive terminal may store any one of the following correspondences, including (1) a correspondence between the SCI and a HARQ receiving process (for example, a HARQ receiving process ID), (2) a correspondence between a HARQ sending process ID and a HARQ receiving process (for example, a HARQ receiving process ID) in the SCI, (3) a correspondence among a HARQ sending process ID, a source identifier, and a HARQ receiving process (for example, a HARQ receiving process ID) in the SCI, where the correspondence may be for distinguishing between HARQ process IDs used by different transmit terminals, (4) a correspondence among a HARQ sending process ID, a source identifier, a destination identifier, and a HARQ receiving process (for example, a HARQ receiving process ID) in the SCI, where different source identifiers may be used by a transmit terminal to communicate with different receive terminals, perform communication through different connections, or communicate with different groups, similarly, different destination identifiers may be used by a receive terminal to communicate with different transmit terminals, perform communication through different connections, or communicate with different groups, in this case, the correspondence may accurately indicate a source terminal and a destination terminal, and (5) a correspondence among a communication type (cast-type), a HARQ process ID in the SCI, a source identifier in the SCI, a destination identifier in the SCI, and a HARQ receiving process (for example, a HARQ receiving process ID). When the receive terminal performs unicast communication and groupcast communication with different transmit terminals, destination identifiers used in unicast communication and groupcast communication may be the same. The correspondence may further be for distinguishing between communication types. The communication types include any one or more of the following: unicast, groupcast, and broadcast.

If the receive terminal stores the foregoing correspondence, when receiving the retransmission of the data, the receive terminal may find a corresponding HARQ process to process the received retransmitted data. For example, refer to FIG. 10D. A transmit terminal 1 sends data 1 to a receive terminal by using a HARQ sending process 1, and a transmit terminal 2 also sends data 2 to the receive terminal by using the HARQ sending process 1. The receive terminal may receive, by using a HARQ receiving process 2, the data 1 sent by the transmit terminal 1, and receives, by using a HARQ receiving process 3, the data 2 sent by the transmit terminal 2. In this case, if the receive terminal further receives retransmitted data of the data 1 sent by the transmit terminal 1 to the receive terminal by using the HARQ process 1, the receive terminal receives, by using the HARQ receiving process 2, the retransmitted data of the data 1 sent by the transmit terminal 1, and performs soft combination and decoding on the data 1 and the retransmitted data of the data 1.

Optionally, the receive terminal may delete the foregoing correspondence when any one or more of the following conditions is met.

(1) The receive terminal successfully decodes the data corresponding to the HARQ process.

(2) The receive terminal transmits a MAC PDU obtained through decoding to a disassembly and demultiplexing (disassembly and demultiplexing) entity.

(3) The receive terminal feeds back an ACK to the transmit terminal.

(4) The receive terminal does not feed back a NACK to the transmit terminal.

(5) A quantity of times for which the receive terminal receives the data associated with the HARQ process reaches a maximum quantity of transmissions. For example, a quantity of times for which the receive terminal receives one TB reaches the maximum quantity of transmissions.

(6) The receive terminal receives an indication indicating a last data transmission. For example, the receive terminal receives one piece of SCI, the SCI includes an indication indicating the last data transmission, and the indication indicates that transmission in the HARQ process is the last transmission.

(7) Duration for transmission in the HARQ process reaches maximum transmission duration. For example, a timer corresponding to the HARQ process expires.

In addition, when the receive terminal receives one piece of SCI, information included in the SCI is all the same as information in the stored correspondence, and data scheduled based on the SCI is newly transmitted data (for example, an NDI in the SCI indicates that the data scheduled based on the SCI is newly transmitted data), the correspondence associated with the SCI may be not deleted, but the data scheduled based on the SCI may be directly received based on the correspondence, or the correspondence associated with the SCI may be deleted, and a HARQ process is selected from unoccupied HARQ processes to receive the data scheduled based on the SCI.

Currently, when a HARQ buffer is flushed in NR UL, on an uplink grant for new transmission, the corresponding HARQ buffer is flushed in NR UL when a MAC PDU to be transmitted is not obtained.

An embodiment of this application provides a new buffer flushing method.

Figure 16:
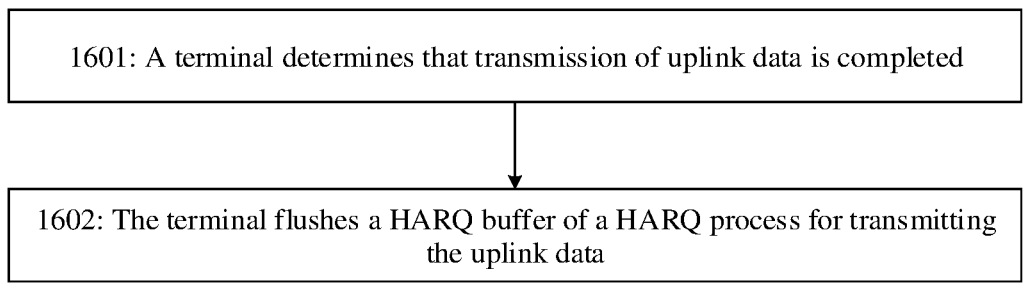

For UL, refer to FIG. 16. The method includes the following steps.

1601: A terminal determines that transmission of uplink data is completed.

During specific implementation of step 16o*i*, the terminal determines that transmission of the uplink data is completed when a quantity of transmissions of the uplink data reaches a maximum quantity of retransmissions, duration for transmission of the uplink data reaches maximum transmission duration, or a configured grant timer (configuredGrantTimer) expires. For details about the configured grant timer, refer to Clause 5.4.1 in 3GPP TS 38.321: "NR; Medium Access Control (MAC); Protocol specification".

1602: The terminal flushes a HARQ buffer of a HARQ process for transmitting uplink data.

For SL, refer to FIG. 17. The method includes the following steps.

1701: In a HARQ process, a terminal determines that transmission of sidelink data is completed, where that sidelink transmission of sidelink data is completed includes that the sidelink data is successfully transmitted, a quantity of transmissions of the sidelink data reaches a maximum quantity of transmissions, or duration for sidelink data transmission reaches maximum transmission duration.

Optionally, the terminal may maintain one HARQ buffer for each HARQ process.

1702: The terminal flushes a HARQ buffer of a HARQ process for transmitting sidelink data.

Optionally, that the sidelink data is successfully transmitted includes any one or more of the following cases:

(1) The terminal receives no NACK of the sidelink data. For example, a scenario is as follows: When a first terminal performs groupcast communication with another terminal, and a HARQ feedback is NACK only (to be specific, after a transmit terminal sends data to a receive terminal, if a part of the one or more receive terminals has correctly received the data, the part of the one or more receive terminals does not send a feedback, or if a part of the one or more receive terminals fails to receive the data, the part of the one or more receive terminals feeds back a NACK to the transmit terminal), the first terminal sends the data to the another terminal by using the HARQ process. If the first terminal receives no NACK when the another terminal sends feedback information, the first terminal considers that the another terminal has correctly received the data.

(2) The terminal receives an ACK of the sidelink data. For example, a scenario is as follows: The first terminal sends data to another terminal by using the HARQ process, and when the first terminal receives an ACK from the another terminal, the first terminal considers that the another terminal has correctly received the data.

(3) The terminal receives an ACK of the sidelink data and no NACK of the sidelink data. In a scenario, when the first terminal performs groupcast communication with another terminal, and a HARQ feedback is an ACK/a NACK (after a transmit terminal sends data to one or more receive terminals, if a part of the one or more receive terminals has correctly received the data, the part of the one or more receive terminals feeds back an ACK to the transmit terminal, or if a part of the one or more receive terminals fails to receive the data, the part of the one or more receive terminals feeds back a NACK to the transmit terminal), the first terminal sends data to another terminal by using the HARQ process, and when the first terminal receives only an ACK from the another terminal, the first terminal considers that the another terminal has correctly received the data.

In the methods shown in FIG. 16 and FIG. 17, the HARQ buffer may be flushed when data transmission is completed. This saves buffer space.

The foregoing mainly describes the solutions of embodiments of this application from a perspective of a method. It may be understood that to implement the foregoing functions, network elements, for example, the network device and the terminal, each include at least one of corresponding hardware structures and software modules for implementing the functions. A person skilled in the art should be easily aware that units and algorithm steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the network device and the terminal may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in embodiments of this application, division into the units is an example, and is merely logical function division. In actual implementation, another division manner may be used.

For example, FIG. 18 is a possible schematic diagram of a structure of a communication apparatus (which is denoted as a communication apparatus 180) in the foregoing embodiments. The communication apparatus 180 includes a processing unit 1801 and a communication unit 1802. Optionally, the communication apparatus further includes a storage unit 1803. The communication apparatus 180 may be configured to illustrate structures of the terminal and the network device in the foregoing embodiments.

When the schematic diagram of the structure shown in FIG. 18 is for illustrating a structure of the terminal in the foregoing embodiments, the processing unit 1801 is configured to control and manage actions of the terminal. For example, the processing unit 1801 is configured to perform 901 to 903 in FIG. 9 (in this case, the terminal is a first terminal), 902 and 903 in FIG. 9 (in this case, the terminal is a second terminal), 1001 to 1011 in FIG. 10, 1001A to 1003A in FIG. 10C, 1601 and 1602 in FIGS. 16, 1701 and 1702 in FIG. 17, and/or perform actions of the terminal in another process described in embodiments of this application. The processing unit 1801 may communicate, by using the communication unit 1802, with another network entity, for example, the second terminal in FIG. 9 when the terminal is a first terminal. The storage unit 1803 is configured to store program code and data of the terminal.

When the schematic diagram of the structure shown in FIG. 18 is for illustrating a structure of the network device in the foregoing embodiments, the processing unit 1801 is configured to control and manage actions of the network device. For example, the processing unit 1801 is configured to send, to the first terminal by using the communication unit 1802, configuration information that is for configuring a type of a resource included in a first resource, and/or perform actions of the network device in another process described in embodiments of this application. The processing unit 1801 may communicate, by using the communication unit 1802, with another network entity, for example, the first terminal. The storage unit 1803 is configured to store program code and data of the network device.

For example, the communication apparatus 180 may be a device, or may be a chip or a chip system.

When the communication apparatus 180 is a device, the processing unit may be a processor. The communication unit may be a communication interface, a transceiver, or an input interface/output interface. Optionally, the transceiver may be a transceiver circuit. Optionally, the input interface/output interface may be an input circuit/output circuit.

When the communication apparatus 180 is the chip or the chip system, the communication unit may be a communication interface, an input interface/output interface, an interface circuit, an output circuit, an input circuit, a pin, a related circuit, or the like on the chip or the chip system. The processing unit may be a processor, a processing circuit, a logic circuit, or the like.

When an integrated unit in FIG. 18 is implemented in a form of a software functional module and sold or used as an independent product, the integrated unit may be stored in a computer-readable storage medium. Based on such an understanding, the technical solutions in embodiments of this application essentially, the part contributing to the conventional technology, or all or a part of the technical solutions may be implemented in a form of a software product. The computer software product is stored in a storage medium and includes several instructions for instructing a computer device (which may be a personal computer, a server, a network device, or the like) or a processor (processor) to perform all or a part of the steps of the methods described in embodiments of this application. The storage medium that stores the computer software product includes any medium that can store program code, such as a USB flash drive, a removable hard disk, a read-only memory (ROM), a random access memory (RAM), a magnetic disk, or an optical disc.

Figure 20:
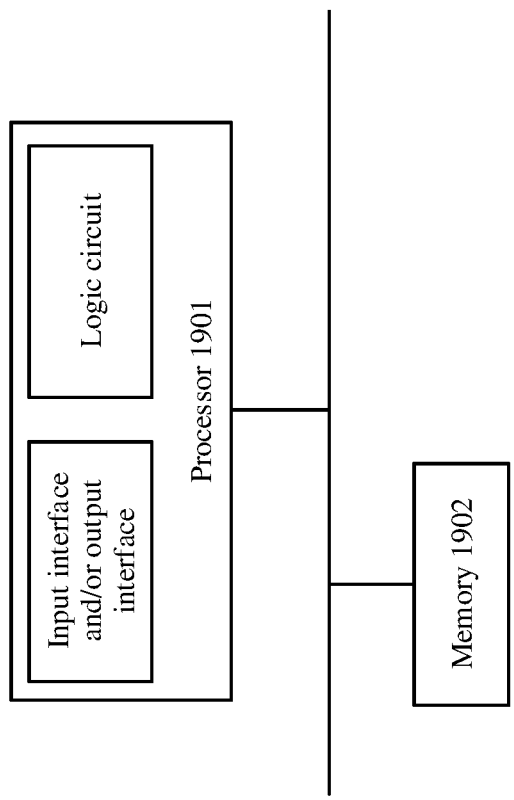

An embodiment of this application further provides a schematic diagram of a structure of hardware of a communication apparatus (denoted as a communication apparatus 190). Refer to FIG. 19 or FIG. 20, the communication apparatus 190 includes a processor 1901, and optionally, further includes a memory 1902 connected to the processor 1901.

The processor 1901 may be a general-purpose central processing unit (CPU), a microprocessor, an application-specific integrated circuit (ASIC), or one or more integrated circuits configured to control program execution of the solutions in this application. The processor 1901 may further include a plurality of CPUs, and the processor 1901 may be a single-core (single-CPU) processor or a multi-core (multi-CPU) processor. The processor herein may be one or more devices, circuits, or processing cores configured to process data (for example, computer program instructions).

The memory 1902 may be a ROM or another type of static storage device that can store static information and instructions, a RAM or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, or a Blu-ray disc), a magnetic disk storage medium or another magnetic storage device, or any other medium that can be for carrying or storing expected program code in a form of instructions or a data structure and that can be accessed by a computer. This is not limited in embodiments of this application. The memory 1902 may exist independently (in this case, the processor may be located outside the communication apparatus, or may be located inside the communication apparatus), or may be integrated with the processor 1901. The memory 1902 may include computer program code. The processor 1901 is configured to execute the computer program code stored in the memory 1902, to implement the method provided in embodiments of this application.

For a first possible implementation, refer to FIG. 19. The communication apparatus 190 further includes a transceiver 1903. The processor 1901, the memory 1902, and the transceiver 1903 are connected through a bus. The transceiver 1903 is configured to communicate with another device or a communication network. Optionally, the transceiver 1903 may include a transmitter machine and a receiver machine. A component configured to implement a receiving function in the transceiver 1903 may be considered as a receiver machine. The receiver machine is configured to perform a receiving step in embodiments of this application. A component configured to implement a sending function in the transceiver 1903 may be considered as a transmitter machine. The transmitter machine is configured to perform a sending step in embodiments of this application.

Based on the first possible implementation, the schematic diagram of the structure shown in FIG. 19 may be for illustrating structures of the terminal and the network device in the foregoing embodiments.

When the schematic diagram of the structure shown in FIG. 19 is for illustrating a structure of the terminal in the foregoing embodiments, the processor 1901 is configured to control and manage actions of the terminal. For example, the processor 1901 is configured to perform 901 to 903 in FIG. 9 (in this case, the terminal is a first terminal), 902 and 903 in FIG. 9 (in this case, the terminal is a second terminal), 1001 to 1011 in FIGS. 10(*a*) and 10(*b*), 1001A to 1003A in FIG. 10C, 1601 and 1602 in FIGS. 16, 1701 and 1702 in FIG. 17, and/or perform actions of the terminal in another process described in embodiments of this application. The processor 1901 may communicate, by using the transceiver 1903, with another network entity, for example, the second terminal in FIG. 9 when the terminal is a first terminal. The memory 1902 is configured to store program code and data of the terminal.

When the schematic diagram of the structure shown in FIG. 19 is for illustrating a structure of the network device in the foregoing embodiments, the processor 1901 is configured to control and manage actions of the network device. For example, the processor 1901 is configured to send, to the first terminal by using the transceiver 1903, configuration information that is for configuring a type of a resource included in a first resource, and/or perform actions of the network device in another process described in embodiments of this application. The processor 1901 may communicate, by using the transceiver 1903, with another network entity, for example, the first terminal. The memory 1902 is configured to store program code and data of the network device.

In a second possible implementation, the processor 1901 includes a logic circuit and at least one of an input interface and an output interface. For example, the output interface is configured to perform a sending action in a corresponding method, and the input interface is configured to perform a receiving action in the corresponding method.

Based on the second possible implementation, the schematic diagram of the structure shown in FIG. 20 may be for illustrating structures of the terminal and the network device in the foregoing embodiments.

When the schematic diagram of the structure shown in FIG. 20 is for illustrating a structure of the terminal in the foregoing embodiments, the processor 1901 is configured to control and manage actions of the terminal. For example, the processor 1901 is configured to perform 901 to 903 in FIG. 9 (in this case, the terminal is a first terminal), 902 and 903 in FIG. 9 (in this case, the terminal is a second terminal), 1001 to 1011 in FIG. 10, 1001A to 1003A in FIG. 10C, 1601 and 1602 in FIGS. 16, 1701 and 1702 in FIG. 17, and/or perform actions of the terminal in another process described in embodiments of this application. The processor 1901 may communicate with another network entity through the at least one of the input interface and the output interface, for example, communicate with the second terminal in FIG. 9 when the terminal is a first terminal. The memory 1902 is configured to store program code and data of the terminal.

When the schematic diagram of the structure shown in FIG. 20 is for illustrating a structure of the network device in the foregoing embodiments, the processor 1901 is configured to control and manage actions of the network device. For example, the processor 1901 is configured to send, to the first terminal by using the transceiver 1903, configuration information that is for configuring a type of a resource included in a first resource, and/or perform actions of the network device in another process described in embodiments of this application. The processor 1901 may communicate with another network entity, for example, the first terminal, through the at least one of the input interface and the output interface. The memory 1902 is configured to store program code and data of the network device.

In an implementation process, the steps of the method in embodiments can be completed by using a hardware integrated logic circuit in the processor, or by using instructions in a form of software. The steps of the method disclosed in embodiments of this application may be directly performed by a hardware processor, or may be performed by a combination of hardware in the processor and a software module.

An embodiment of this application further provides a computer-readable storage medium, including instructions. When the instructions are run on a computer, the computer is enabled to perform any one of the foregoing methods.

An embodiment of this application further provides a computer program product, including instructions. When the instructions are run on a computer, the computer is enabled to perform any one of the foregoing methods.

An embodiment of this application further provides a communication system, including the foregoing plurality of terminals (for example, the first terminal and the second terminal), the foregoing terminal (for example, the first terminal) and a network device, or the foregoing plurality of terminals and a network device.

All or a part of the foregoing embodiments may be implemented by using software, hardware, firmware, or any combination thereof. When a software program is used to implement embodiments, all or a part of embodiments may be implemented in a form of a computer program product. The computer program product includes one or more computer instructions. When the computer program instructions are loaded and executed on a computer, all or a part of the procedures or functions are generated according to embodiments of this application. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, persons skilled in the art may understand and implement another variation of the disclosed embodiments by viewing the accompanying drawings, disclosed content, and the appended claims. In the claims, the term "comprise" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered to have covered any of or all modifications, variations, combinations or equivalents within the scope of this application. It is clear that, a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A communication method applied for a first terminal or a chip for the first terminal, comprising:
   determining first hybrid automatic repeat request (HARQ) information associated with a first sidelink grant, wherein the first sidelink grant is associated with carrying data between the first terminal and a second terminal, and wherein the first HARQ information comprises a first HARQ process identifier associated with the first sidelink grant;

sending the first HARQ information to the second terminal through a sidelink, wherein the sidelink is a direct wireless communication link between the first terminal and the second terminal;
obtaining a third sidelink grant for retransmitting the data;
determining the first HARQ process identifier as a HARQ process identifier associated with the third sidelink grant; and
sending second HARQ information to the second terminal, wherein the second HARQ information comprises the first HARQ process identifier associated with the third sidelink grant.

2. The method according to claim 1, wherein the first HARQ information further comprises new data indication information, and wherein the new data indication information indicates that a corresponding transmission is at least one of a new transmission or a retransmission.

3. The method according to claim 1, further comprising:
storing at least one of a correspondence between the first sidelink grant and the first HARQ process identifier, a correspondence between the first HARQ process identifier and a second HARQ process identifier, or a correspondence among the first sidelink grant, the first HARQ process identifier, and the second HARQ process identifier, wherein the second HARQ process identifier is at least one of a HARQ process identifier determined for the first sidelink grant according to a preset algorithm, or a HARQ process identifier indicated by a network device to the first sidelink grant.

4. The method according to claim 3, wherein the second HARQ process identifier associated with the first sidelink grant is the same as, or different from, a fourth HARQ process identifier associated with the third sidelink grant, wherein the fourth HARQ process identifier is at least one of a HARQ process identifier determined for the third sidelink grant according to the preset algorithm, or a HARQ process identifier indicated by the network device to the third sidelink grant.

5. The method according to claim 1, wherein the first sidelink grant belongs to a second resource, and wherein the second resource comprises one or more of:
a resource of the sidelink;
a mode-1 resource of the sidelink;
a mode-2 resource of the sidelink;
a configured grant resource of the sidelink;
a type-1 configured grant resource of the sidelink;
a type-2 configured grant resource of the sidelink;
a dynamic grant resource of the sidelink; or
a configured grant resource set of the sidelink, wherein the configured grant resource set comprises one or more configured grant resources corresponding to one or more configured grant resource indexes.

6. The method according to claim 1, wherein further comprising performing, before the determining the first HARQ information for the first sidelink grant:
determining, by the first terminal, that there is data to be sent on the first sidelink grant.

7. An apparatus, comprising:
at least one processor and
a non-transitory memory storing computer instructions for execution by the at least one processor, the computer instructions including instructions for:
determining first hybrid automatic repeat request (HARQ) information associated with a first sidelink grant, wherein the first sidelink grant is associated with carrying data between the apparatus and a second terminal, and wherein the first HARQ information comprises a first HARQ process identifier associated with the first sidelink grant;
sending, by the apparatus, the first HARQ information to the second terminal through a sidelink, wherein the sidelink is a wireless direct communication link between the apparatus and the second terminal;
obtaining, by the apparatus, a third sidelink grant for retransmitting the data;
determining, by the apparatus, the first HARQ process identifier as a HARQ process identifier associated with the third sidelink grant; and
sending, by the apparatus, second HARQ information to the second terminal, wherein the second HARQ information comprises the first HARQ process identifier associated with the third sidelink grant.

8. The apparatus according to claim 7, wherein the first HARQ information further comprises new data indication information, and wherein the new data indication information indicates that a corresponding transmission is at least one of a new transmission or a retransmission.

9. The apparatus according to claim 7, wherein the computer instructions further include instructions for:
storing at least one of a correspondence between the first sidelink grant and the first HARQ process identifier, a correspondence between the first HARQ process identifier and a second HARQ process identifier, or a correspondence among the first sidelink grant, the first HARQ process identifier, and the second HARQ process identifier, wherein the second HARQ process identifier is at least one of a HARQ process identifier determined by the apparatus for the first sidelink grant according to a preset algorithm, or a HARQ process identifier indicated by a network device to the first sidelink grant.

10. The apparatus according to claim 9, wherein the second HARQ process identifier associated with the first sidelink grant is the same as, or different from, a fourth HARQ process identifier associated with the third sidelink grant, wherein the fourth HARQ process identifier is at least one of a HARQ process identifier determined by the apparatus for the third sidelink grant according to the preset algorithm, or a HARQ process identifier indicated by the network device to the third sidelink grant.

11. The apparatus according to claim 7, wherein the first sidelink grant belongs to a second resource, and wherein the second resource comprises one or more of:
a resource of the sidelink;
a mode-1 resource of the sidelink;
a mode-2 resource of the sidelink;
a configured grant resource of the sidelink;
a type-1 configured grant resource of the sidelink;
a type-2 configured grant resource of the sidelink;
a dynamic grant resource of the sidelink; or
a configured grant resource set of the sidelink, wherein the configured grant resource set comprises one or more configured grant resources corresponding to one or more configured grant resource indexes.

12. The apparatus according to claim 7, wherein the computer instructions further include instructions for performing, before the determining the first HARQ information for the first sidelink grant:
determining, by the apparatus, that there is data to be sent on the first sidelink grant.

13. A non-transitory memory storage medium comprising computer-executable instructions that, when executed by a device, cause the device to perform:

determining first hybrid automatic repeat request (HARQ) information associated with a first sidelink grant, wherein the first sidelink grant is associated with carrying data between a first terminal and a second terminal, and wherein the first HARQ information comprises a first HARQ process identifier associated with the first sidelink grant;

sending the first HARQ information to the second terminal through a sidelink, wherein the sidelink is a wireless direct communication link between the first terminal and the second terminal;

obtaining a third sidelink grant for retransmitting the data;

determining the first HARQ process identifier as a HARQ process identifier associated with the third sidelink grant; and sending second HARQ information to the second terminal, wherein the second HARQ information comprises the first HARQ process identifier associated with the third sidelink grant.

14. The non-transitory memory storage medium according to claim 13, wherein the first HARQ information further comprises new data indication information, and wherein the new data indication information indicates that a corresponding transmission is at least one of a new transmission or a retransmission.

15. The non-transitory memory storage medium according to claim 13, wherein the instructions further cause the device to perform:

storing at least one of a correspondence between the first sidelink grant and the first HARQ process identifier, a correspondence between the first HARQ process identifier and a second HARQ process identifier, or a correspondence among the first sidelink grant, the first HARQ process identifier, and the second HARQ process identifier, wherein the second HARQ process identifier is at least one of a HARQ process identifier determined for the first sidelink grant according to a preset algorithm, or a HARQ process identifier indicated by a network device to the first sidelink grant.

16. The non-transitory memory storage medium according to claim 15, wherein the second HARQ process identifier associated with the first sidelink grant is the same as or different from a fourth HARQ process identifier associated with the third sidelink grant, wherein the fourth HARQ process identifier is at least one of a HARQ process identifier determined for the third sidelink grant according to the preset algorithm, or a HARQ process identifier indicated by the network device to the third sidelink grant.

17. The non-transitory memory storage medium according to claim 13, wherein the first sidelink grant belongs to a second resource, and the second resource comprises one or more of:

a resource of the sidelink;
a mode-1 resource of the sidelink;
a mode-2 resource of the sidelink;
a configured grant resource of the sidelink;
a type-1 configured grant resource of the sidelink;
a type-2 configured grant resource of the sidelink;
a dynamic grant resource of the sidelink; or
a configured grant resource set of the sidelink, wherein the configured grant resource set comprises one or more configured grant resources corresponding to one or more configured grant resource indexes.

* * * * *